United States Patent [19]

Norem

[11] 4,004,083

[45] Jan. 18, 1977

[54] METHOD AND APPARATUS FOR DETERMINING CENTROID COORDINATES AND ANGULAR ORIENTATION OF A SURFACE

[75] Inventor: Philip Chrislock Norem, Fort Erie, Ontario, Canada

[73] Assignee: Autotelic Industries, Inc. Ontario, Canada

[22] Filed: Oct. 25, 1972

[21] Appl. No.: 280,548

[52] U.S. Cl. .................... 358/125; 178/DIG. 21; 250/203 CT

[51] Int. Cl.² .......................................... H04N 7/18

[58] Field of Search ............ 178/6.8, 7.2, DIG. 21; 250/203 CT

[56] References Cited
UNITED STATES PATENTS 3,513,318  5/1970  Birnbaum et al. ........... 178/DIG. 21
3,541,246  11/1970  Goldfischer .............. 178/DIG. 21
3,541,249  11/1970  Chambers et al. ......... 178/DIG. 21

Primary Examiner—Howard W. Britton
Assistant Examiner—Michael A. Masinick

[57] ABSTRACT

Apparatus for determining the centroid of an area by scanning the area with a television scanner in a rectangular scan, summating voltages derived from the scan and utilizing said voltages to derive the co-ordinates of the centroid. The invention also extends to apparatus for determining the position and orientation of an object utilizing said centroid determining apparatus and performing a rectangular scan and a spiral scan of the object.

33 Claims, 17 Drawing Figures

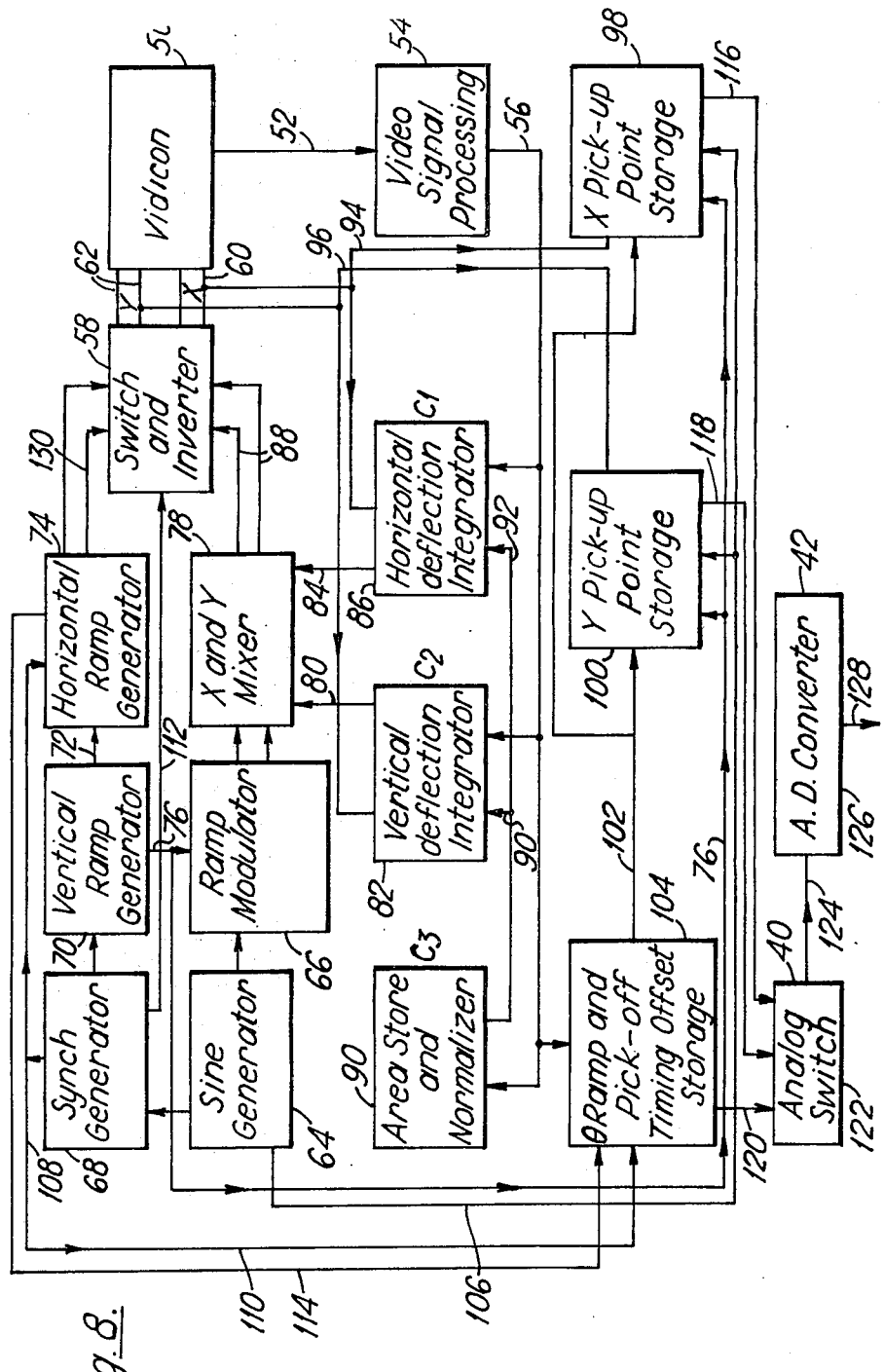

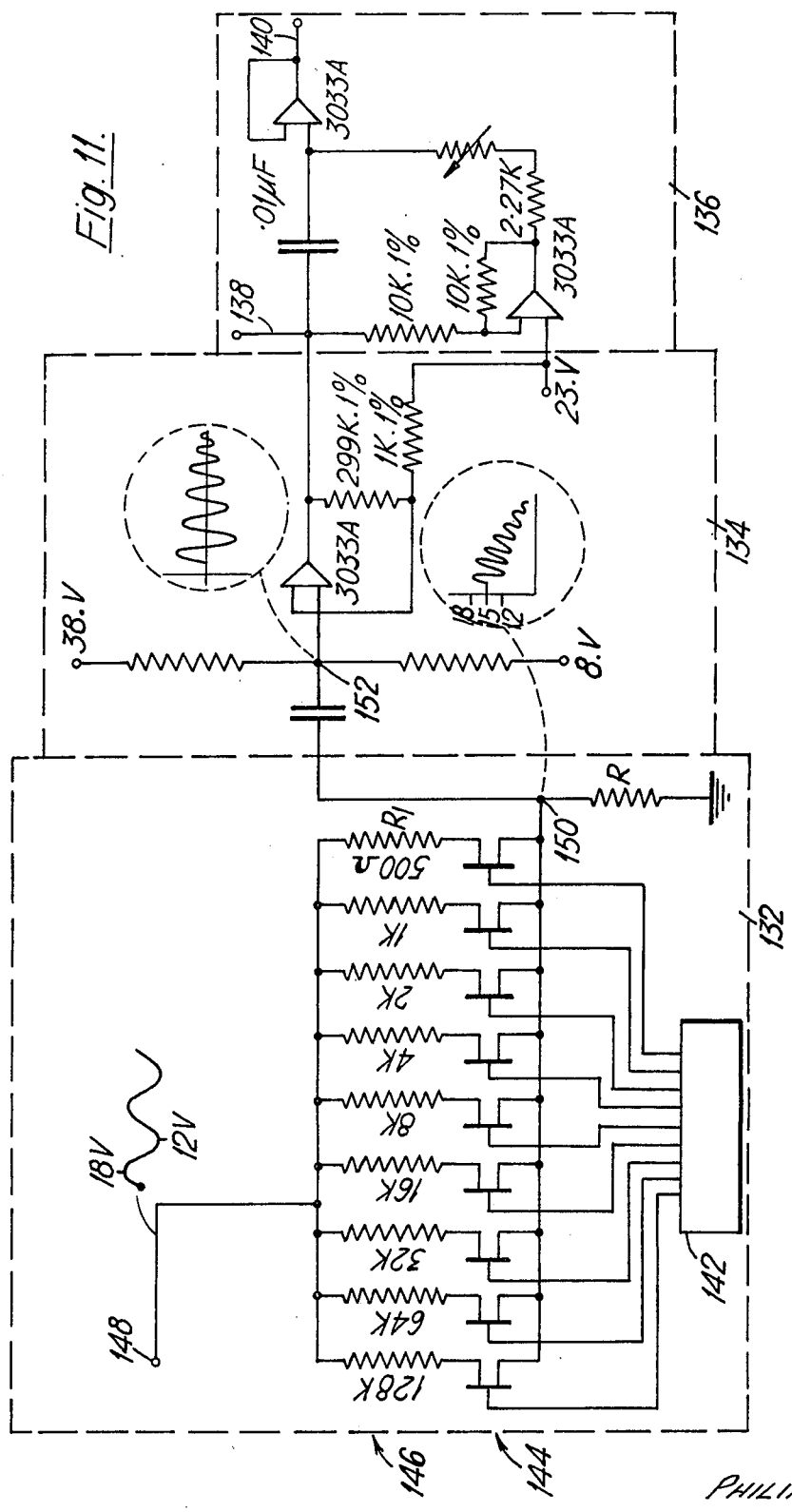

Inventor
PHILIP C. NOREM
By Nolte & Nolte
Attorneys 4,004,083

METHOD AND APPARATUS FOR DETERMINING CENTROID COORDINATES AND ANGULAR ORIENTATION OF A SURFACE

This invention relates to apparatus for determining the centroid of an area and apparatus for determining the position and orientation of an object on a plane surface utilizing such centroid-determining apparatus.

Apparatus for determining the position and orientation of an object on a plane surface is particularly advantageous for use in an automatic control system for controlling article-handling apparatus. In Canadian Pat. No. 759,321 issued May 23, 1967 (George C. Devol) based on U.S. patent application Ser. No. 226,203 of Sept. 26, 1962, there is disclosed programmed article-handling apparatus in which a plurality of programmed positions are provided to which an article is to be moved. Such programmed positions are identified by combination-codes having numerical values corresponding to locations along the path of motion of an actuator. The programme in the programmed apparatus is based on an analogue concept.

In Canadian Pat. No. 767,802, issued Sept. 19, 1967 (George C. Devol) there is also described programmed apparatus for moving a work member to different points in space, the work member comprising jaws of an article-handling apparatus capable of closing on an article to be handled and possibly transported to a different location by the article-handling apparatus or, alternatively, to be held in position whilst a particular work function is performed thereon. In the U.S., typical article-handling apparatus is manufactured by Unimation Inc. under the trade name Unimate.

A disadvantage of the programmed apparatus referred to above is that previously prepared programmes have to be used to control the work member of the article-handling apparatus and this imposes a restraint on the flexibility of use of the article-handling apparatus.

In addition to the analogue systems referred to above, digital systems are known which require relatively complex digital evaluation circuits and require relatively large capacity programme controllers and computers. Such digital systems are thus relatively expensive and are furthermore restricted in their flexibility.

It is an object of the present invention to provide novel apparatus for determining the co-ordinates of the centroid of an area.

It is a further object to provide novel apparatus for determining the position and orientation of an object on a plane surface utilizing the aforementioned centroid determining apparatus whereby, in one embodiment, greater flexibility in the use of article-handling apparatus may be achieved.

An embodiment of the present invention will now be described, by way of example, with reference to the accompanying drawings in which.

Figure 7:
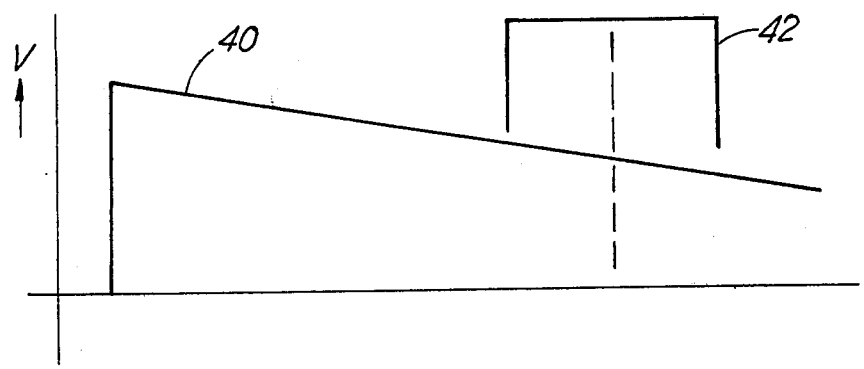
Figure 9:
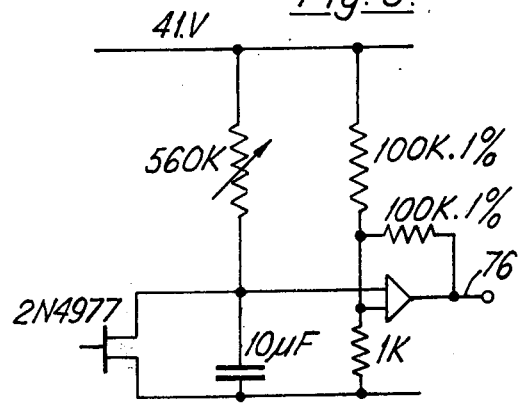
Figure 10:
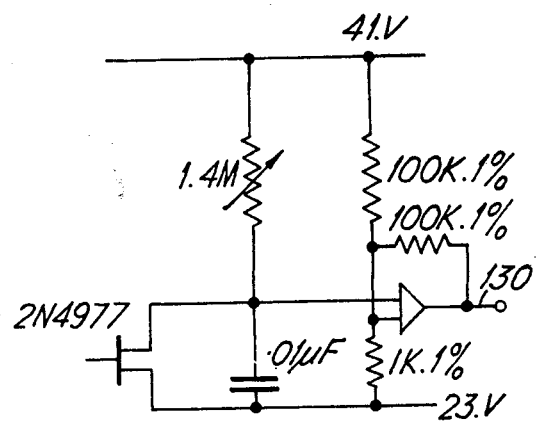
Figure 12:
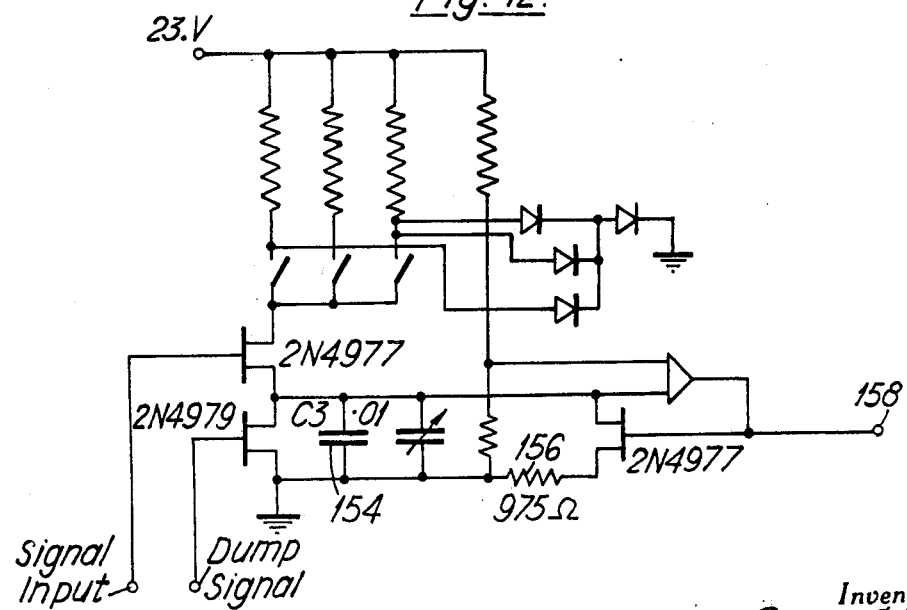
Figure 13:
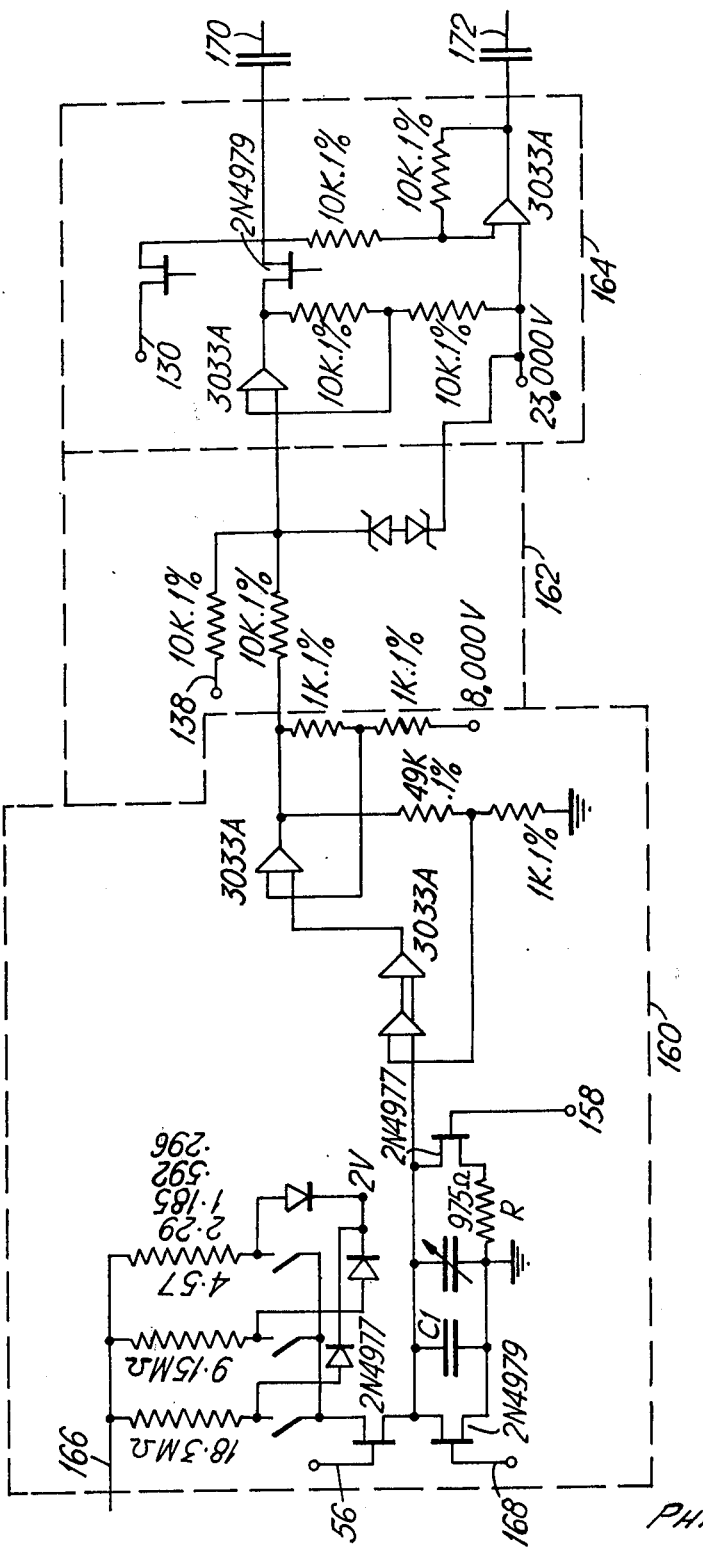
Figure 14:
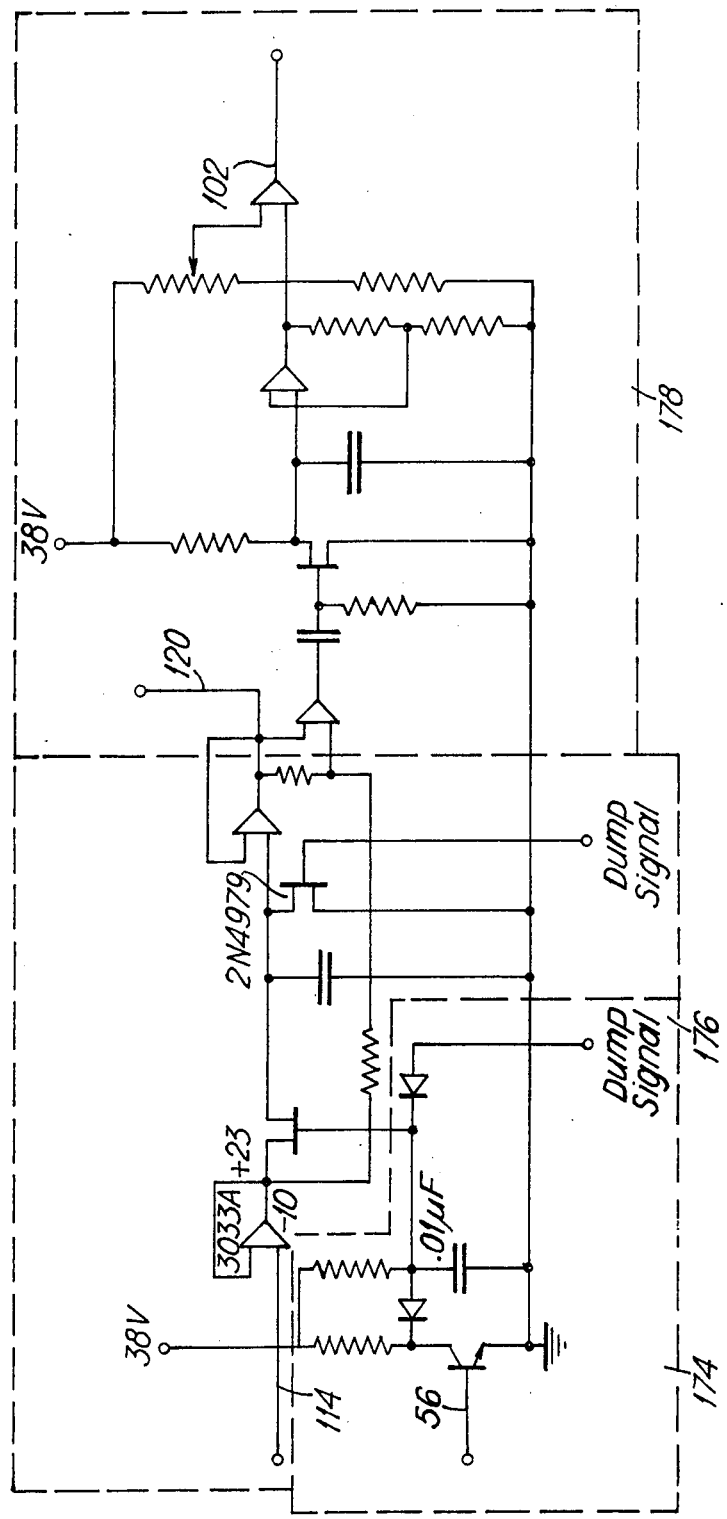
Figure 15:
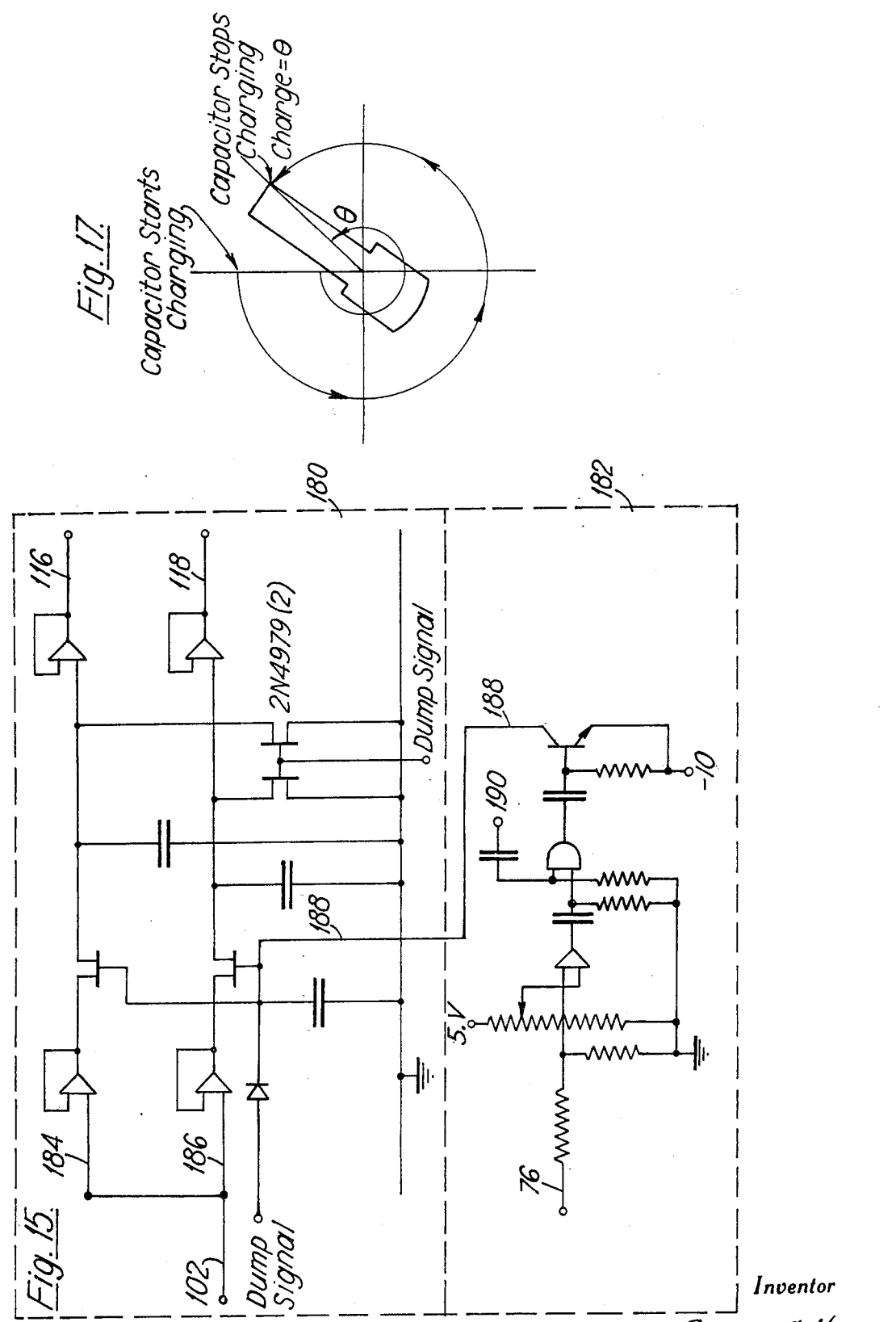
Figure 16:
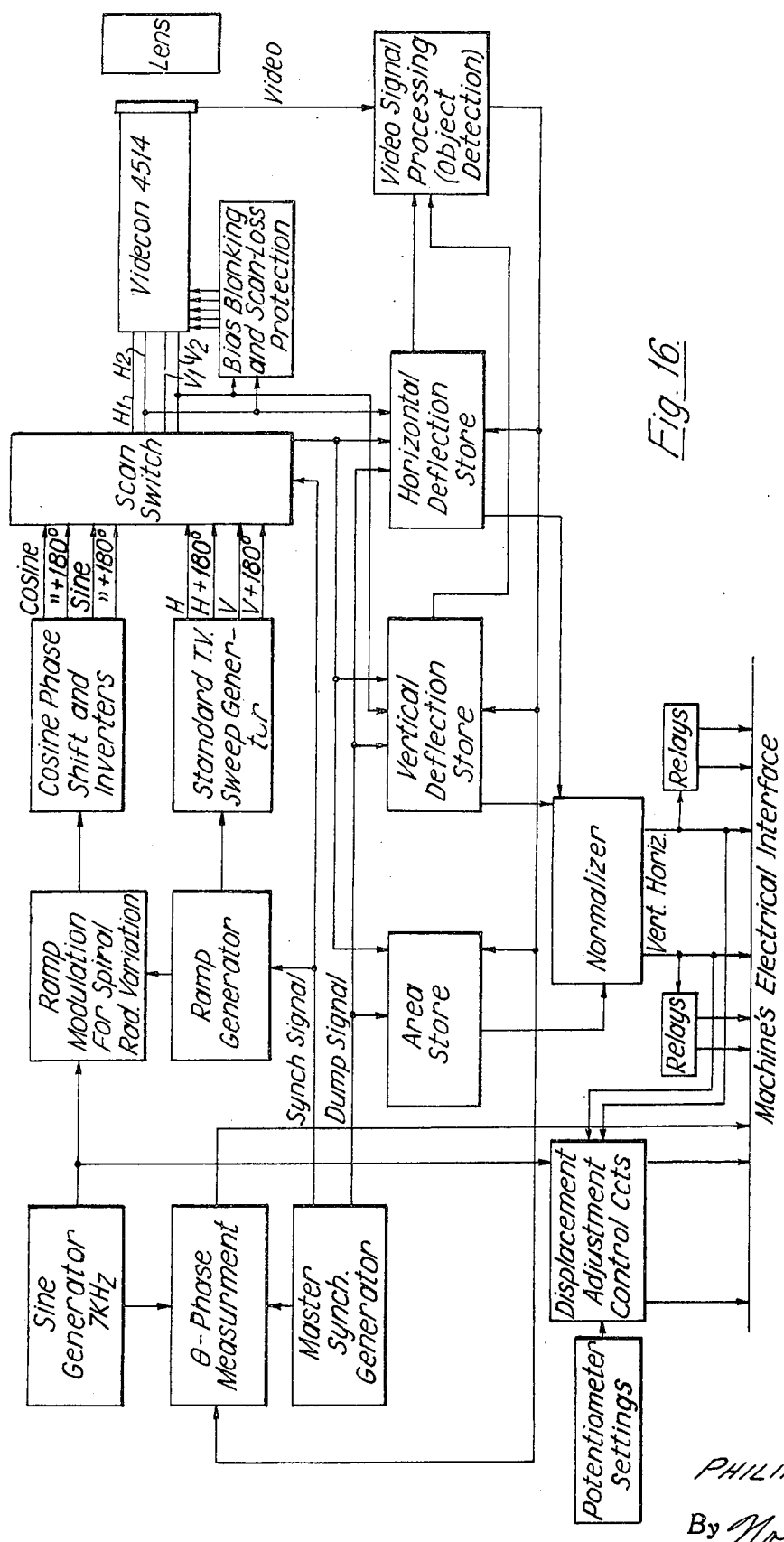

FIG. 6 again illustrates the rectangular scan sawtooth waveform;

FIG. 7 is a representation of the vertical scan voltage of the rectangular frame circuits;

FIG. 8 is a diagrammatic representation of centroid determining apparatus according to one embodiment of the present invention;

FIG. 9 illustrates a typical circuit of a vertical ramp generator;

FIG. 10 illustrates a typical circuit for a horizontal ramp generator;

FIG. 11 illustrates a typical spiral waveform generator;

FIG. 12 illustrates an area normalization circuit for use according to the present invention;

FIG. 13 diagrammatically illustrates a bias storage circuit, a spiral mixing circuit and a switching stage for use according to the present invention;

FIG. 14 is a diagrammatic representation of the pick-off storage and timing circuits;

FIG. 15 diagrammatically illustrates the $x$ and $y$ pick-off storage stages;

FIG. 16 diagrammatically illustrates a block diagram of apparatus according to the invention particularly for use with a Unimate machine tool; and FIG. 17 is a simplified diagram for use in consideration of the operation with machine tools.

According to said one aspect of the present invention there is provided apparatus for determining the co-ordinates of the centroid of an area including: first means for directing a scanning device at said area; second means for causing said scanning device to electronically scan said area in a substantially rectangular raster pattern, each line scan of said raster being at a predetermined respective voltage; third means for generating a line scan voltage having a first fixed value at one end of the line scan and a second fixed value at the other end of the line scan, said first and second fixed voltages being the same and the rate of variation therebetween being the same for each line scan; fourth means for obtaining a first summated final voltage by summating a quantity proportional to each predetermined respective voltage for the duration of time the corresponding line scan is incident on the area; fifth means for obtaining a second summated final voltage by summating the respective portions of the line scan voltage for the duration of time the corresponding line scan is incident on said area; sixth means for summating a quantity proportional to the time durations of the incidence of the respective line scans on the area; seventh means for determining the particular time taken for said summated quantity to decrease at a constant rate to a predetermined value; eighth means for causing said first and second summated voltages to decrease at said constant rate for said particular time whereby the resultant voltage corresponding to said first summated voltage is representative of one rectangular co-ordinate of said centroid in the plane containing said area and the resultant voltage corresponding to said second summated voltage is representative of the second rectangular co-ordinate in said plane.

According to said other aspect of the present invention, there is provided apparatus for determining the position and orientation of an object for providing pick-up signals to a work member, said object always presenting the same surface area in one direction including: first means for directing a scanning device at said object from said one direction; second means for causing said scanning device to scan said object in a substantially rectangular raster pattern to locate the centroid of said area and to provide first signals indicative of the location of said centroid; third means for causing said scanning device to scan said object in a substantially spiral pattern towards the located centroid; fourth means responsive to the first incidence of said spiral scan pattern with the object and to provide a second signal corresponding thereto; fifth means responsive to said second signal and said first signals to calculate the position of a predetermined pick-up part of said object; and sixth means for providing further resultant signals indicative of the position and relative "orientation" of said pick-up part to said work member.

The specific embodiment to be described is concerned with the problem of providing signals for operation of the working member of an article-handling apparatus, which signals will be indicative of the position and orientation of an article. The article will be considered as resting on a plane but it will be appreciated that that plane may comprise spaced-apart support points, for example a work table or a roller conveyor in a manufacturing installation. When articles are located on a particular plane surface and are viewed from points which are always the same distance from the plane surface and in a direction at right angles to the plane surface, then the contour or surface area presented by the article is always the same. In article-handling apparatus, articles of the same type have normally to be picked up by a work member at particular pick-up points on the article and the pick-up points are normally the same for each article of that type. Thus, the described apparatus is designed to be used in article-handling apparatus so as to give information as to the position and orientation of an object, i.e., an article, whereby the co-ordinates of the pick-up point or points may be provided for the article-handling apparatus. This is achieved by utilizing a television camera to perform a rectangular scan of the object whereby the co-ordinates of the centroid of the surface area presented by the object may be obtained. The television camera is then controlled so as to perform a spiral electronic scan of the said area of the object, the spiral scan being centred on and converging into the centroid of the area. As the spiral scan converges into the centroid, the scan is incident on the object being examined and the first point of incidence is always the same point on the said area of the object. The position of this point in relation to the centroid is known from a knowledge of the object, as also is the relative position of each pick-up point in relation to the centroid and the first point of contact of the spiral scan. Therefore, signals can readily be generated indicative of the coordinates of the pick-up point and of the centroid in space, whereby the position and orientation of the object under examination is known.

DETAILED DESCRIPTION OF THE INVENTION

The apparatus for determining the position and orientation of an object includes three equal capacitors $C_1$, $C_2$ and $C_3$ which assume particular representative voltages, in the manner discussed below and these are utilized to determine the required co-ordinates.

Figure 1:
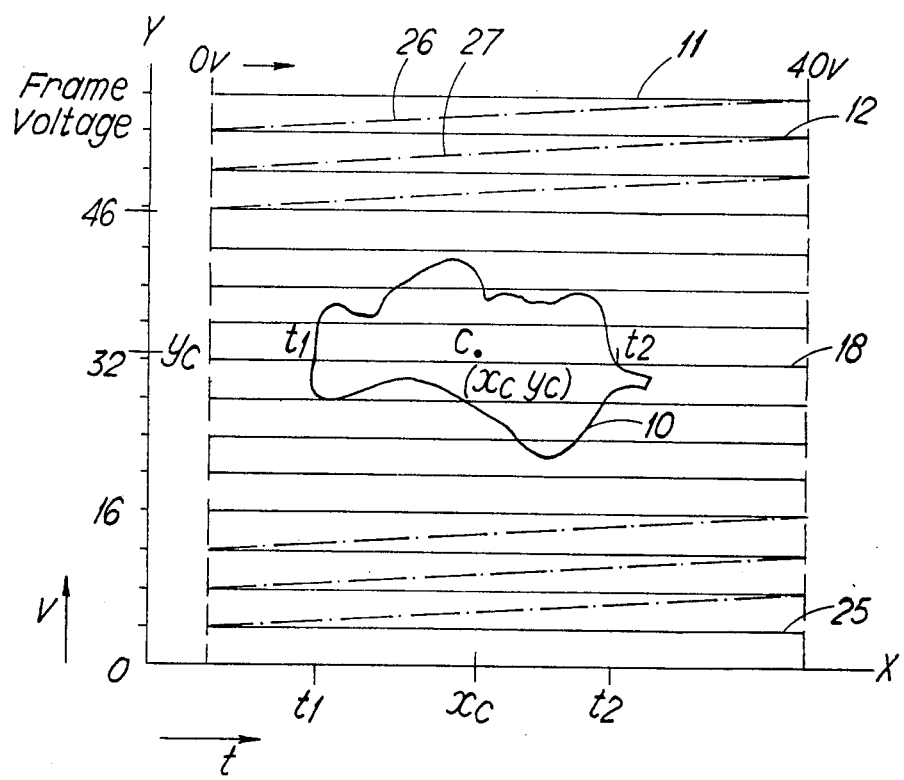
FIG. 1 is a graphical representation of the contour of an article to be examined by apparatus according to the present invention.

In FIG. 1 there is diagrammatically illustrated the contour 10 of an article to be examined by apparatus according to the invention as it would appear to a television camera scanning the area of contour 10 as referred to above. For convenience of description, the horizontal scan lines 11 through 25 of the television camera are drawn superimposed over the area, only some of the scan lines being identified by numbers. As is well known, the fly-back lines, such as 26 and 27, between each pair of scan lines will be suppressed.

The mathematical method of determining the centroid of an area is well known but it will be reproduced below for completeness sake in relation to the area confined by the contour 10.

It will be assumed that the area confined by the contour 10 is area A and that the centroid C is at the co-ordinate position $x_c$, $y_c$.

Choosing the usual two mutually perpendicular axes OX and OY, and assuming that $(x,y)$ is the co-ordinate position of a small element SA of the area A, and $(x_c, y_c)$ defines the coordinate position of the centroid c of the area A, then by taking moments about OY we obtain $A \cdot x_c = Lt\ \Sigma\ \delta\ x.\ A$ where $A$ is the total area $\delta A \longrightarrow 0$ Hence: $A \cdot x_c = \int X \cdot dA$ i.e. $x_c = \int \frac{x \cdot dA}{A} = \frac{\int x \cdot dA}{\int dA}$ \hfill (1)

Similarly, taking moments about OX $y_c = \int \frac{y \cdot dA}{A} = \frac{\int y \cdot dA}{\int dA}$ \hfill (2)

the integrations being taken over the whole area.

Thus, the co-ordinate position of the centroid C is defined in relation to the area and this is utilized in the described apparatus according to the present invention. Summated voltages are obtained which are representative of $\int x.dA$; $\int y.dA$; and $\int .dA$ and these are utilized to derive the co-ordinates $x_c$, $y_c$ in accordance with equations (1) and (2) above.

Figure 2:
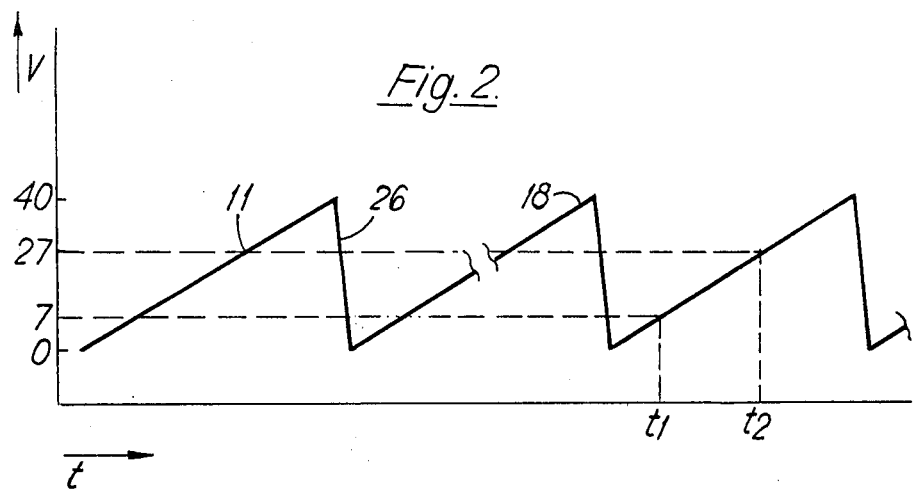
FIG. 2 is a graphical representation of the sawtooth waveform generated by a scan voltage generator.

In the described embodiment of the present invention a television scanner is arranged to scan the article, i.e. area 10, horizontally as indicated by the horizontal scan lines 11 through 25. As will be appreciated, the scan lines are actually very close together and a large number thereof will scan the area 10. However, for convenience only a few representative scan lines are shown in FIG. 1. Each scan line 11 through 25 is actually the long sloping portion of a sawtooth voltage, as shown in FIG. 2, generated by a suitable voltage generator and increasing, for example, from 0 volts at the beginning of each scan line to 40 volts at the end of each line scan. Thus, the time duration each line scan is incident on the area defined by contour 10 corresponds to the voltage difference between two voltages on the scan lines sawtooth and, since each scan line is synchronized to start from the same voltage, zero, then the sum of all the voltages corresponding to the time the various line scans are incident on the area defined by contour 10, for simplicity referred to as the area 10 herein, will be truly representative of a summation of all the horizontal dimensions of the area 10 taken throughout the area at minute intervals corresponding to the intervals between line scans. The resultant is actually the product of a voltage and a distance corresponding to the summations of the horizontal, $x$, dimensions of the area 10. If now this can be divided by another voltage corresponding to the area of the contour 10, then a voltage corresponding to the first co-ordinate $x_c$ of the centroid C will be determined in accordance with equation (1) above.

To determine the vertical co-ordinate $y_c$ of the centroid C, use is made of the fact that each line scan 11 through 25 is actually at a different vertical frame voltage. Use is also made of the time during which the respective "scan lines" are incident on the object being scanned and thus if all the respective vertical frame voltages are summated only for the time of incidence of the respective scan lines on the area 10, then the final voltage will be representative of the average value of the voltage multiplied by the distance of line scan covered by those of the scan lines 11 through 25 which are actually incident on the area 10. Since these scan lines are so close together this total distance is equivalent to the area of area 10 and therefore if the final voltage is divided by another voltage which is representative only of the area 10, then the resultant will be the vertical co-ordinate $y_c$ of the centroid C of the area 10.

As mentioned above, three capacitors are utilized in accordance with the described embodiment. The first capacitor stores up the voltage derived from the line scan which is utilized to determine the horizontal co-ordinate $x_c$ of centroid C, the second capacitor is utilized to store up the voltage, derived from the vertical frame voltages, which is utilized to obtain the vertical co-ordinate $y_c$ of centroid C whilst the third capacitor is utilized to store a voltage which is itself truly representative of the area defined by the contour 10. All these capacitors are of equal size and will be identified in the description below as $C_1$, $C_2$ and $C_3$, respectively.

Considering the first capacitor ($C_1$) for determining the horizontal co-ordinate $x_c$ of centroid C; as mentioned above, this capacitor stores, i.e. integrates, a voltage derived from the line scanning voltage. This voltage is derived from a sawtooth waveform voltage generator which provides a voltage substantially as illustrated in FIG. 2, wherein the sawtooth starts at 0 volts and increases to 40 volts in a linear fashion. To facilitate comparison between the scan lines indicated in FIG. 1 and in FIG. 2, the first scan line 11 is indicated in FIG. 2 together with the corresponding flyback portion of the waveform 26. If we now consider a scan line 18 which includes a portion between times $t_1$ and $t_2$ which is incident on the area 10, we can readily indicate that portion of the scan line 18 in FIG. 1 and can also indicate that portion of the scan line in FIG. 2.

Referring to FIG. 2, it will be seen that in the time between $t_1$ and $t_2$ the scan line voltage 18 increases from 7 volts to 27 volts whilst the scan line is actually crossing the area 10. Thus, the capacitor $C_1$ has a voltage applied to it between the times $t_1$ and $t_2$ which increases in a linear fashion from 7 volts to 27 volts. Similarly, for each of the scan lines a voltage is applied to capacitor $C_1$ for a time corresponding to the time each scan line is scanning the area 10 and the value of the lower and upper limits of the applied voltages is determined by the respective portions of the sawtooth waveform which are actually incident on the area 10.

Capacitor $C_1$ thus stores an average integrated voltage corresponding to the average of all the horizontal dimensions of the area 10 and in equation (1) this is $\int x.dA$.

It will be clear that it is only necessary to perform one rectangular frame scan of the object to obtain the actual date. However, if necessary, other frame scans could be performed so as to effect a "clean-up" operation of the camera and associated circuitry functioning.

To determine the vertical co-ordinate $y_c$ of the centroid of area 10, the second capacitor $C_2$ stores the average voltage of a plurality of voltages, each of which is at a fixed vertical frame voltage and is applied to capacitor $C_2$ only for the length of time which the respective scan line is incident on the area 10. As is well known, each line scan 11 through 25 is at a fixed different vertical frame voltage and thus there is one particular vertical frame voltage which corresponds to the position of the centroid C and is indicative of the vertical component $y_c$. A typical scale for the vertical frame voltages is indicated on the vertical axis of FIG. 1 and it will be seen that the vertical frame voltage for a scan line lies between 0 and 64 volts and is dependent on the position of the scan line in the scanning frame raster. As a particular one of the scan lines 11 through 25 is incident on the area 10, so the corresponding fixed vertical frame voltage is applied to capacitor $C_2$ for a time interval corresponding to the time the respective scan line is actually incident on the area 10. Thus for scan line 18 a fixed voltage of 32 volts is applied to capacitor $C_2$ for the time interval $t_1$ and $t_2$. In a corresponding manner the other vertical frame voltages are applied to capacitor $C_2$ for a time corresponding to the time of the respective scan line on the area 10. Thus, capacitor $C_2$ stores the average integrated voltage of the voltages applied to it and this is representative of the position of the vertical co-ordinate $y_c$ of the centroid of area 10 and in equation (2) this appears as $\int y.dA$.

From the above description it will be seen that voltages have now been obtained which correspond to the numerator of equations (1) and (2). It is now only necessary to obtain a voltage corresponding to the size of area 10, i.e. A or $\int dA$, and then the co-ordinates $x_c$, $y_c$ of the centroid can be readily determined.

The third capacitor $C_3$ is utilized for obtaining this quantity $\int dA$ and there is applied thereto a constant voltage whenever any one of the scan lines 11 through 25 is incident on the area 10. Thus a constant voltage is applied to capacitor $C_3$ only when it is being scanned and since the scan lines 11 through 25 are, in practice, very close together then the time for which the constant voltage is applied to capacitor $C_3$ is truly representative of the magnitude of the area 10. Thus, the charge accumulated by capacitor $C_3$ will itself be representative of the size of area 10, as also will the final voltage assumed by the capacitor $C_3$.

In order to determine the position of the centroid C as represented by the rectangular co-ordinates $x_c$, $y_c$ of FIG. 1, it is necessary to carry out the calculations represented by the mathematical equations (1) and (2) by an electrical analogy. This is accomplished by allowing capacitor $C_3$ to discharge to a predetermined reference voltage through a known resistor, the time of discharge being thus representative of the area A (i.e., $\int dA$). Since the capacitors $C_1$, $C_2$ and $C_3$ are all of equal capacity, then if capacitors $C_1$ and $C_2$ are permitted to discharge for a time equal to the time taken for capacitor $C_3$ to discharge to said predetermined reference voltage, then the final voltage on capacitors $C_2$ and $C_3$ will be representative of the coordinates $x_c$ and $y_c$ respectively because there has been effectively carried out mathematical calculations corresponding to equations (1) and (2) above. Thus, the co-ordinates of the centroid C of area 10 (FIG. 1) have been determined and represented on the voltage scale of the scanning system of the electronic scanner, i.e., television camera. The determined voltages representing the co-ordinates of centroid C can, if desired, be provided on a pair of connection lines to apparatus associated with the article-handling apparatus so as to be utilized as control voltages for the work member thereof.

Figure 3:
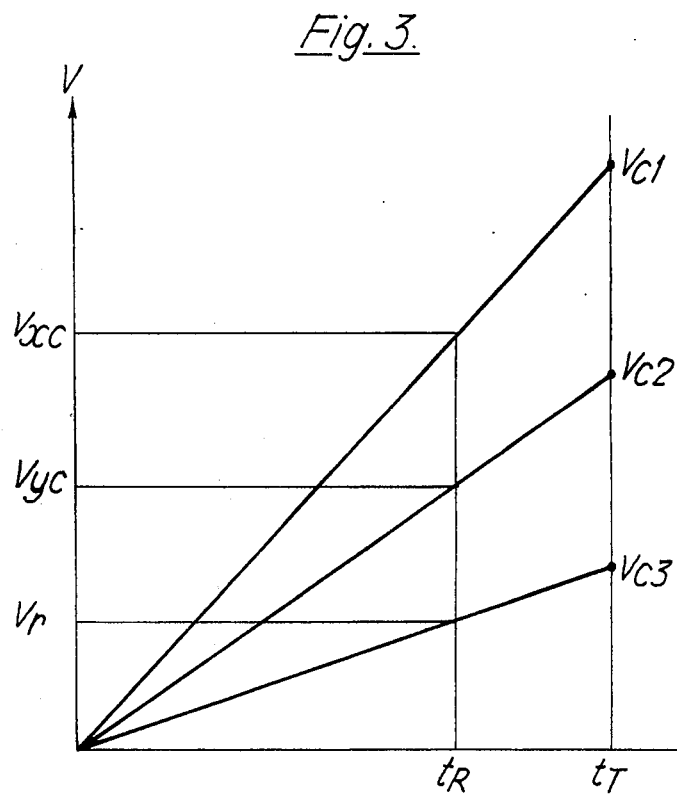
FIG. 3 is a representation of the charge curves of capacitors used in apparatus according to the present invention.

The way in which the time of discharge of capacitor $C_3$ to a predetermined reference voltage is utilized to determine the required time of discharge of capacitors $C_1$ and $C_2$ will perhaps be better understood from a consideration of FIG. 3 and the description below. In FIG. 3 there is illustrated the charge curves of a voltage against time for each of the capacitors $C_1$, $C_2$ and $C_3$. During a rectangular scan of the area 10 (FIG. 1) all the capacitors $C_1$, $C_2$ and $C_3$ are subject to a respective potential or plurality of potentials for a total time $t_T$ which is a summation of all the times of scan, such as $t_2 - t_1$, i.e. $\Sigma\, t_2 - t_1$. In this total time of scan the capacitor $C_1$ has been charged up to a potential $V_{c1}$, capacitor $C_2$ has been charged up to a potential $V_{c2}$ whilst capacitor $C_3$ has been charged up to a potential $V_{c3}$. Capacitor $C_3$ is now discharged through said predetermined known resistor R to a voltage $V_r$. The time of discharge is thus $t_T - t_R$ in FIG. 3 and it is now necessary, according to the described embodiment of the present invention, to discharge capacitors $C_1$ and $C_2$ for the same time interval $t_T - t_R = T_D$. This is achieved by allowing the respective capacitors $C_1$ and $C_2$ to be discharged through resistors which have an equal resistance to the known predetermined resistor R through which the capacitor $C_3$ was discharged. Capacitors $C_1$ and $C_2$ are thus discharged so as to assume final potentials $V_{xc}$ and $V_{yc}$ which are representative of the co-ordinates of the centroid, i.e. $x_c$ and $y_c$.

The discharge of the various capacitors may be considered from a mathematical point of view, as below:
Let
$C = C_1 = C_2 = C_3$
$R = R_1 = R_2 = R_3 = $ the constant value of resistance to be connected across the capacitors,
$t_D = $ the time of discharge of capacitor $C_3$,
$V_{c3} = $ the maximum voltage stored on capacitor $C_3$,
$V_{c2} = $ the maximum voltage stored on capacitor $C_2$, and
$V_{c1} = $ the maximum voltage stored on capacitor $C1$.

Considering the discharge of capacitor $C_3$ through the resistor R for a period of time $t_D$ to the predetermined constant voltage $V_r$, then the equation of discharge is given by:

$$V_R = V_{c3} \cdot e^{\frac{-t_D}{RC}} \tag{3}$$

Considering capacitor $C_2$ the representative centroid voltage $V_{yc}$ is given by the equation:

$$V_{yc} = V_{c2} \cdot e^{\frac{-t_D}{RC}} \tag{4}$$

Turning now to capacitor $C_1$ the centroid voltage $V_{xc}$ is given by the equation:

$$V_{xc} = V_{c1} \cdot e^{\frac{-t_D}{RC}} \tag{5}$$

The time of discharge of capacitor $C_3$ through resistor $R_1$ can be determined from equation (3) above since the voltage $V_R$ is a known and fixed voltage whilst the voltage $V_{c3}$ can be measured. Therefore, the time of discharge $t_D$ can be determined, and since the voltages $V_{c2}$ and $V_{c1}$ may be measured, i.e., determined, if necessary, then we can readily determine the value of the voltages $V_{xc}$ and $V_{yc}$ representing the $x$ and $y$ co-ordinates of the centroid C.

As will be clear, the rate of discharge of the capacitors is $-t_D/RC$ and this is the same constant for all the capacitors $C_1$, $C_2$ and $C_3$. Therefore, by permitting capacitor $C_1$ and capacitor $C_2$ to discharge at the same rate as the capacitor $C_3$ was discharged to the reference voltage $V_R$, then we obtain the final voltages $V_{xc}$ and $V_{yc}$ on respective capacitors $C_1$ and $C_2$. These voltages correspond to the co-ordinates $x_c$ and $y_c$ of the centroid C of area 10 (FIG. 1).

In a practical arrangement the center position of the rectangular scan was arranged to be 32 volts (FIG. 1) whilst the constant predetermined reference voltage $V_R$ was 460 millivolts. The ratio between these voltages is 50:1 and therefore the voltages $V_{xc}$ and $V_{yc}$ were actually proportional to the true centroid voltages by the same ratio 50:1.

The above operation may conveniently be referred to herein as normalization.

When a rectangular scan of the area of contour 10 has been made, then the voltages stored on the capacitors are normalized by the following relationships, expressed in simple terms.

The horizontal capacitor $C_1$ stores up a voltage $V_x$ which is given by $$A \cdot \overline{V}_x = \int{_a V_x \cdot y \cdot dx}$$

where $V_x$ is the horizontal deflection voltage at point X (i.e. horizontal co-ordinate $x$) and $y$ is a constant times the sensing time spent at the deflection $V_x$. The vertical capacitor $C_2$ stores up in the same way the voltage $V_y$ where:

$$A \cdot \overline{V}_y = \int{_a V_y \cdot x \cdot dy}$$

where $V_y$ is the value of the vertical deflection voltage at the vertical co-ordinate $y$ and $x$ is a constant multiplied by the time of scan of the particular scan line at the deflection voltage represented by $V_y$.

Simultaneously the area capacitor $C_3$ stores a voltage $V_a$ represented by $\overline{V}_a = \int{_a y \cdot dx}$.

This is simply the area A of the contour 10 and one obtains the equations below:

$$V_{xc} = \frac{\overline{V_x}x}{V_a} \text{ and } V_{yc} = \frac{\overline{V_y}}{V_a}$$

These equations correspond to the equations (1) and (2) and it will be seen that normalization has been effected.

Figure 4:
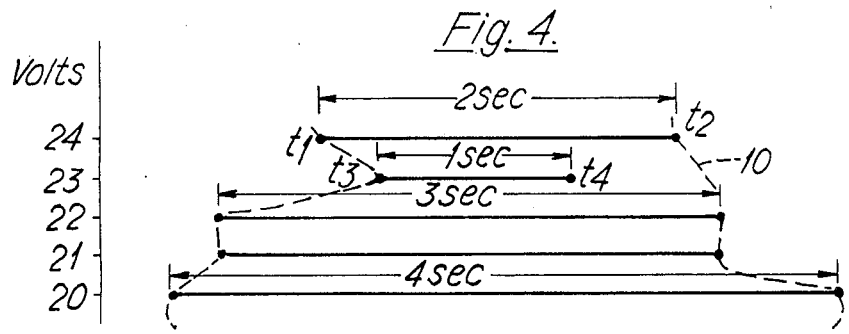
FIG. 4 illustrates typical scan lines to assist in description of the operation of the apparatus according to the invention.

The operation of the apparatus in determining the centroid may be considered by reference to a specific numerical example, as illustrated in FIG. 4. Five scan lines will be considered at respective scan line voltages 20, 21, 22, 23 and 24 volts, respectively. The first scan line is incident on the area of contour 10 for a time $t_1$ to $t_2 = 2$ seconds, the second scan line is incident on the contour area 10 for a time $t_3$ to $t_4$, equals one second, at respective voltages of 24 and 23 volts. The vertical centroid of the area 10 is given by equation (2) as $y_c = \int y dA / \int dA$. In the present instance, the voltage representing the area may be taken as the summation of the time differences $t_2 - t_1$, $t_4 - t_3$ . . . Thus, the voltage representing the co-ordinate $y_c$ of the centroid may be represented as $$\frac{V_y = V_y \cdot A}{A} = \frac{\Sigma V_1 (t_2 - t_1)}{(t_2 - t_1)} (t_4 - t_3) + \ldots \text{ where } V_1 \text{ is}$$

where $V_1$ is the representative line scan voltage.

Therefore with reference to FIG. 4 the centroid thereof is given as $$V_y = \frac{(24 \times 2) + (23 \times 1) + (22 \times 3) + (21 \times 3) + (20 \times 4)}{(2 + 1 + 3 + 3 + 4)} = 1/13 \ (280) = 21.7/13 \text{ volts.}$$

Thus, the vertical co-ordinate $y_c$ of the centroid of area 10 is represented by a voltage of 21.7/13 volts.

The $x$ co-ordinate $x_c$ of the centroid can similarly be determined.

After voltage signals representing the rectangular co-ordinates $(x_c, y_c)$ of the centroid C of the contour area 10 have been determined, then apparatus according to the present invention automatically performs a spiral scanning of the area 10, The spiral scanning operation is arranged to converge from outside the area 10 and towards the centroid C as determined by the previous rectangular scan of the area 10.

Figure 5:
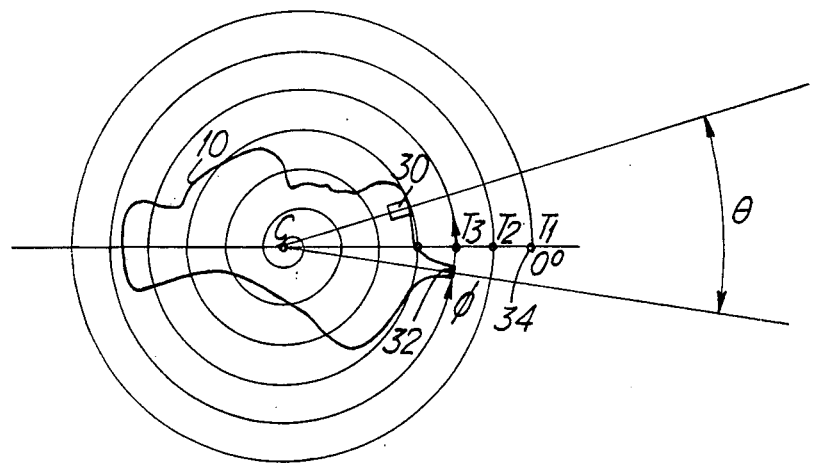
FIG. 5 is a diagrammatical representation of a spiral scan waveform.

The principle of performing a spiral scan directed inwards toward the centroid C is well known and by way of example, a spiral scan waveform is indicated in FIG. 5 in relation to the contour area 10. It is assumed, in this instance, that the apparatus is designed to control a machine tool adapted to pick up an object, having the contour 10, by means of a pick-up portion 30, the articles always being of the same shape and thus the pick-up portion 30 being always located in the same position on the respective article. As will be appreciated, the pick-up portion 30 is thus always at a constant angle in relation to that point 32 on the article which is farthest removed from the centroid C, being an angular measurement centered on the centroid C, as shown in FIG. 5. It will be clear from FIG. 5 that whenever a spiral scan, directed towards centroid C, is performed on an article of the same shape, then the first point of incidence of the spiral scan on the article must in every case be the extreme point 32 (FIG. 5), thus once the position of point 32 is determined in relation to the centroid C of contour area 10 it is possible to determine the location of the pick-up portion 30 which is known to be at an angle to the extreme point 32 in relation to the centroid C. The pick-up portion 30 is, of course, the same shape for each article.

It will also be apparent that once the information as to the position of the extreme peripheral point 32 is obtained in relation to the centroid C, it is no longer necessary to continue with the spiral scanning operation which can thus be terminated, if desired. However, it will be apparent that the spiral scanning operation must always commence at the same point 34 in relation to the centroid C in order that one may have a clear reference from which to determine the location of the extreme point 32. One must also have the co-ordinates of the centroid C, as will be apparent, but these have already been determined by the above-described rectangular scanning operation.

In practice, the spiral scanning voltage circuits are permitted to continue in operation for a predetermined known time, beyond incidence on the point 32 (FIG. 5) until the respective portion of the spiral scan line has travelled to, or adjacent to, the pick-up point 30. Thus, a control voltage can be derived from the travel of the spiral scan line between the point 32 and the point 30 and it will be apparent that this will give the pick-up voltage representative of the $x$ and $y$ components of the pick-up point 30 represented in polar co-ordinates. The apparatus according to the present invention, as described, is provided with a plurality of pre-set potentiometers whereby the correct setting for the angle $\theta$ can be pre-set into the apparatus. The voltage obtained from the voltage circuits of the spiral scan network is principally utilized to provide a control function. When the start of the spiral scan is initiated at time $T_1$, point 34 (FIG. 5), the rectangular scan circuits are synchronized therewith so as to initiate the synchronized start of the rectangular frame waveform. As the spiral scanning is proceeding the horizontal or rectangular scanning process is also proceeding in a synchronized manner.

As the spiral scan line is incident on extreme point 32 of contour 10, a control is immediately operated to store the respective instantaneous voltage of the horizontal waveform at that particular point. In one practical embodiment the actual voltage stored was onefifth of the horizontal scan waveform voltage after a desirable cleaning operation. The particular voltage on the rectangular scan waveform is identified in FIG. 6 as $V_\phi$ occurring at an angle $\phi$ after time $T_2$ — the time at which the spiral scan last crossed the zero angle reference line. The rectangular waveform circuits are arranged to always give off a control pulse at this point.

Figure 6:
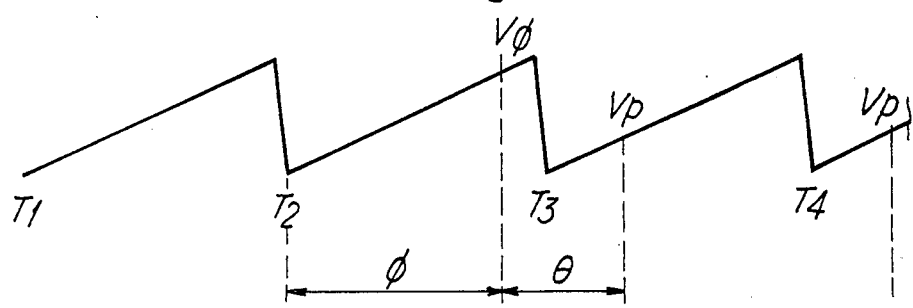

It is known that the pick-up point 30 is at a predetermined known angle $\theta$ from the extreme orientation point 32 because the centroid of the area 10 is known and the shape, i.e. contour, of the object, is also known. Thus, a voltage is triggered from the horizontal scan waveform at a predetermined time interval after the voltage $V_\phi$ representing the position at which the spiral scan was incident on point 32. This triggered voltage is henceforth triggered on each of the respective line scan waveforms — as shown in FIG. 6 and represented by the voltage $V_p$.

It is now desirable to determine the pick-up point 30 in relation to the centroid C, i.e. in terms of the rectangular co-ordinate system which is used. This is achieved by arranging that the vertical scan voltage of the rectangular scan frame is triggered at the instant of time $T_1$ when the spiral scan waveform commences. A prefixed pulse is arranged to be provided at the next time corresponding to the pick-up point, i.e., the next occurrence of the voltage $V_p$ (FIG. 6).

This prefixed pulse is a "wide" pulse but its width is so selected that only one orientation pulse $V_\phi$ will be coincident therewith. However, if two of the orientation voltage pulses $V_\phi$ are very close together this will not really matter.

The prefixed wide pulse is gated with the respective orientation pulse $V_\phi$ so as to provide a gate output pulse which is truly representative, in time, of the angular position of the extreme point 32 in relation to point 34 (FIG. 5) representing the start of the spiral scan at 0°. Since the angular separation $\theta$ of the pick-up point or portion 30 is known on the same angular scale, since it is equal to ($\phi + \theta$).

The circuit is thus designed so as to provide an output pulse corresponding to the instant when the spiral scan is over the pick-up point 30 and thus representative of the rectangular co-ordinates $(x, y)$ of the pick-up point.

The manner in which this is accomplished will be better understood by reference to FIG. 7, wherein the vertical scan voltage of the rectangular frame circuits is represented by the decreasing voltage line 40 whilst the above-mentioned "wide" pulse 42 is also illustrated in FIG. 7 together with the respective representative orientation voltage pulse 44. The gated pulse output derived from pulses 42 and 44 is delayed by a time corresponding to the angle $\theta$ and this becomes truly representative of the pick-up point 30 (FIG. 5). Since the spiral scan is centered on the centroid C whose co-ordinates $(x_c, y_c)$ in the rectangular co-ordinates' system are known, then the two rectangular co-ordinates of the pick-up point 30 are readily derived. Furthermore, the angle $\phi$ gives the true orientation of the particular object under examination and thus the apparatus is so designed that it provides output signals giving:

1. the $x, y$ co-ordinates of the pick-up point 30, and
2. the orientation information for the respective article or contour 10 as derived from the measured angle $\phi$.

In one particular constructed embodiment, the apparatus was designed to give three voltage outputs representative of the above information (1) and (2) as voltage levels, i.e., three analogue output signals which can be identified as below:

1. $\phi = V_\phi$
2. the $x$ co-ordinate position of the pick-up point 30 obtained from the spiral scan voltage of FIG. 5 = $V_{xp}$
3. the $y$ co-ordinate position of the pick-up point 30, again derived from the spiral scan voltage of FIG. 5 = $V_{yp}$ The above three voltages (1), (2) and (3) may be conveniently utilized for controlling the operation of a pick-up work member of a machine tool, for example the Unimation machine tool referred to above.

As will be seen from the above description, it is necessary to feed certain information into the apparatus before commencing the operation. The machine tool associated with the apparatus will, for a predetermined time, be operating in respect of articles having the same contour shape 10 with the respective pick-up point 30 always located in the same position on the article. This information is fed into the apparatus according to the present invention, representing the angle $\theta$ in FIG. 5 and giving the radial distance $r_p$ of the pick-up point 30 from the centroid C. The required information may conveniently be fed into the apparatus by utilizing two potentiometer controls which are pre-set so as to represent the angle $\theta$ and the distance $r_p$. In this way, relatively simple controls are required for the apparatus according to the present invention. If desired, a third pre-set potentiometer may be provided which may be pre-set so as to cause the first part of the spiral scan waveform to be suppressed so as to eliminate any outside interference or rubbish which may be encountered.

If desired, the analogue information output of the apparatus will be transformed into a digital output if the succeeding machine, to be controlled, requires a digital input for control information.

In one constructed embodiment, the scanning device was a television camera and the centroid was determined by using the scanning technique therewith. The camera was actually a Vidicon (trade name) camera having an electrostatic tube. An electrostatic deflection camera was used because it was found that the magnetic deflection type of camera tested had a time lag between the application of current to the magnetic coils and the actual scanning operation. The reason for this appears to be that there is an inherent magnetic field and the magnetic field can only be changed gradually and not instantaneously. This disadvantage may, of course, be overcome by suitable design but it is found that with an electrostatic camera the scanning beam followed the applied scanning voltage substantially instantaneously and the required circuits were thus less complicated than with the magnetic deflection type camera. However, it will be appreciated that in some instances it may be preferable to utilize the magnetic deflection type of camera with apparatus according to the present invention.

Centroid determining apparatus according to one embodiment of the present invention is illustrated in FIG. 8. A Vidicon camera 50 is provided to scan the object, i.e. contour 10, as explained above, and this provides a video signal output along connection 52 to a video signal processing stage 54 which itself provides an output along connection 56 in a manner which will be clear to a person skilled in the art and will be explained below.

Control of the vidicon camera 50 is effected by way of a switch and inverter stage 58 capable of supplying $x$ control signals along connections 60 and $y$ control signals along connections 62.

The respective voltages and waveforms for controlling the operation of the circuit are, in part, derived from a sine-wave generator 64. The sine-wave generator 64 controls the operations of ramp modulator 66 and a synch-generator 68, the latter providing an output to a vertical ramp generator 70 capable of providing two outputs. The first output is provided along connection 72 to a horizontal ramp generator 74 whilst a second output is provided along connection 76 to the ramp modulator stage 66, this being for controlling the spiral radius variation and phase shift. The ramp modulator stage 66 provides outputs to the $x$ and $y$ mixer stages 78 which also receives an input along connection 80 from a vertical deflection integrator stage 82 and along the connection 84 from a horizontal deflection integrator stage 86 and thus the mixer stage 78 is able to provide output voltages along the connections 88 to the switch and inverter stage 58, corresponding to the voltages required for operation of the Vidicon tube in a spiral mode.

The above-mentioned first capacitor $C_1$ for determining the horizontal co-ordinate $x_c$ of centroid C (FIG. 1) is contained within the horizontal deflection integrator stage 86 which also includes the object offset $x$ amplifier. The second capacitor $C_2$ for determining the vertical co-ordinate $y_c$ of centroid C is contained within the vertical deflection integrator stage 82 which also includes the object offset $y$ amplifier. Also, the third capacitor $C_3$ for obtaining a voltage corresponding to the size of area 10 in FIG. 1 is included within the area store and normalizer stage 90 in FIG. 8. Each of these stages 86, 82 and 90 receives an input, derived from the Vidicon camera 50 through the video signal processing stage 54, along connection 56 which is representative of the area scanned by the Vidicon camera 50. Thus, each of the stages 86, 82 and 90 will operate so as to charge-up the respective capacitors $C_1$, $C_2$ and $C_3$ as described above. The stages 82 and 86 will provide outputs along connections 80 and 84 which will, in turn, result in control voltages appearing on connections 83 to affect the switch and inverter stage 58 whereby the stages 82 and 86 will themselves be controlled by control voltages along their respective connections to the connections 60 and 62.

In this way, the capacitor will be charged up as described and similarly the area capacitor $C_3$ will be charged up by way of the area store and normalizer stage 90 which receives an input from connection 56. Control connections 90 and 92 between the area capacitor stage 90, the vertical capacitor stage 82 and the horizontal capacitor stage 86 are illustrated in FIG. 8 whereby the capacitors $C_2$ and $C_1$ may be respectively controlled so as to discharge through the resistor, of standard value, through which capacitor $C_3$ was discharged as described above.

Switching of the Vidicon camera 50 from a rectangular scan to a spiral scan pattern is controlled by way of the $x$ and $y$ mixer stages 78, the latter receiving inputs along connections 80 and 84 and also from the spiral scan voltage from stage 66 is passed to the switch and inverter stage 58 to control operation of the Vidicon camera 50 in a spiral scan pattern. Control voltages are also supplied along connections 94 and 96 respectively to an $x$ pick-up point storage stage 98 and a $y$ pick-up point storage stage 100 as shown in FIG. 8. Each of these stages is also supplied with an output, along connection 102, from a $\theta$ ramp and pick-off timing offset storage stage 104. It will be seen that the latter stage also receives an input from the Vidicon camera stage 50 by way of the video signal processor stage 54 and connection 56.

It will be seen from FIG. 8 that the sine-wave generator 64 supplies control waveforms along connection 106 to the $x$ and $y$ pick-up point storage stages 98 and 100 whilst the synchronizing generator 68 supplies synchronizing voltages along connection 108 to the horizontal ramp generator 94 and, along connection 110, to the $\theta$ ramp stage 104. Similarly, the synchronizing generator 68 provides synchronizing voltages on connection 112 to the switch and inverter stage 58 whilst an output from the horizontal ramp generator 74 is provided, along the connection 114, to an input of the 0 ramp stage 104.

An output from the illustrated apparatus in FIG. 8 for determining the position and orientation of an object is obtained along the output connections 116, 118 and 120, the output from connection 116 representing the $x$ co-ordinate of the centroid C (FIG. 1), the output along connection 118 representing the $y$ co-ordinate, and the output along connection 120 representing the orientation ($\theta$) of the object being scanned by the Vidicon camera 50. These output voltages are, of course, analogue outputs which are fed to an analogue switch stage 122 which itself provides an output along connection 124 to an analogue/digital converter stage 126. A digital output is thus obtained along the output connection thereof 128 for use in controlling a subsequent machine tool, for example, the Unimate machine tool mentioned above. However, it will be appreciated that the analogue voltages on connections 116, 118 and 120 may be used directly in some arrangments and are not restricted to use for controlling the said machine tool.

The construction and arrangement of the stages within the blocks illustrated to FIG. 8 will be clear to a man skilled in the art having regard to known circuits and configurations and will therefore not be described in detail, it being appreciated that some, or all, stages may comprise digital circuits. However, by way of example, some typical circuits will be described below.

In FIG. 9, there is illustrated a typical circuit for the vertical ram generator 70 of FIG. 8. The types of components, and the value thereof, where appropriate, are indicated thereon and the operation of the circuit will be clear to a man skilled in the art. Thus, it will not be described in detail but it will be noted that the $y$ deflection output voltage is obtained on connection 76 which is indicated in both FIGS. 8 and 9. The output along the connection 72 of FIG. 8 may also be obtained from the same point.

In FIG. 10, there is diagrammatically illustrated a typical circuit for the horizontal ramp generator, identified as 74 in FIG. 8. Again, the type of components and the value thereof is indicated in the Figure whilst the $x$ deflection output voltage from the circuit is available on connection 130 (FIGS. 8 and 10).

A typical spiral waveform generator, identified as 66 in FIG. 8, is diagrammatically illustrated in FIG. 11.

Referring to FIG. 11, the spiral waveform generator 66 includes a digital attenuator circuit 132, an AC amplifier 134 having an amplification of 300 times and a 90° phase-shifter circuit 136. The output to the $x$ and $y$ mixer stages of FIG. 8 is obtained on connections 138 and 140 in FIG. 11 and it will be seen that the digital attenuator circuit 132 includes a 9 bit digital counter 132, which may be constructed by micro-circuit techniques, having nine field-effect transistors 144 each connected in series with a respective resistor 146 and through the respective resistor to a common potential terminal 148. The voltage applied to potential terminal 148 comprises a D.C. voltage of approximately 15 volts having imposed thereon an A.C. signal of 6 volts peak-to-peak magnitude. Thus, the D.C. voltage is arranged to vary an alternating fashion between 12 volts and 18 volts and this voltage is applied to one end of each of the respective resistors 146. The digital attenuator circuit 132 is designed so as to give an output at terminal 150 and this is applied to the A.C. amplifier circuit 134. In this way, automatic switching is achieved due to the connection, on selection, of the respective transistors 144, in series with their respective resistors, whereby a plurality of step voltages are obtained. The control element shown is a nine bit counter, such as might be produced by connecting several Texas Instruments SN7493N circuits in series. The input to the counter is a square wave of the same frequency as the basic sine-wave, and obtained from it.

The counter circuit may well comprise two integrated circuits, one of which is a counter produced by Texas Instruments Corporation under the serial number SN7493N and the other under the serial number SN7442N. The effect of these is to provide a sixteen position stepping switch whereby long periods corresponding to the vertical cycle and short periods corresponding to the horizontal cycle are achieved. It is of importance to note that the cycling step constitutes a completed operation. Sixteen positions may be particularly required for apparatus designed to function with the above-mentioned Unimate apparatus because this incorporates digital stepping logic having the capacity to specify sixteen commands, and, when necessary, specifying any one of eight digital locations. For the analogue portion of the described circuitry only eight of these commands are used, by way of illustration as shown in FIG. 11. These are:

It will be appreciated that the circuits of FIGS. 9 and 10 produce certain waveforms for the vertical and horizontal scanning operations by periodically dumping a capacitor which is being charged a constant rate and amplifying the signal thus produced with a feedback controlled amplifier. The ramp modulator of FIG. 11, the associated amplifier 134 and the phase-shifter 136 produce a decreasing sinusoidal signal which is used in the projection of the offset spiral scanning voltage. The digital circuit 140 controls the set of FET transistors 144 which control the overall resistance of the set of resistors 146. Thus, a variable resistor attenuator is produced which attenuates the sinusoidal signal in a controlled manner, the sinusoidal signal being the input at terminal 148 and being amplified in amplifier 134 to give the output at terminal 150. One output is obtained at connection 138 (FIG. 11) and a complement thereof, 90° out of phase, is obtained and provided at connection 140. The decreasing amplitude sinusoidal output is utilized in the remaining circuits.

The area normalization circuit illustrated in FIG. 12 charges up a capacitor during periods when the video indicates the presence of an object (i.e. contour 10 of FIGS. 1 and 5). The charging voltage is a constant 23 volts and thus the final voltage stored represents the

| No. | 4th place Bit | 3rd place Bit | 2nd place Bit | Low Order Bit | |
|---|---|---|---|---|---|
| 0 | 0 | 0 | 0 | 0 | Command for Inaction |
| 1 | 0 | 0 | 0 | 1 | Command for Dumping voltage of O, Xp and Yp |
| 2 | 0 | 0 | 1 | 0 | Command for Resetting scan to rectangular |
| 3 | 0 | 0 | 1 | 1 | Command for Storing horizontal and vertical centroid data |
| 4 | 0 | 1 | 0 | 0 | Command for Dumping the horizontal, vertical and area capacitors |
| 5 | 0 | 1 | 0 | 1 | Command for Normalizing centroid data |
| 6 | 0 | 1 | 1 | 0 | Command for Storing 0, Xp and Yp data |
| 7 | 0 | 1 | 1 | 1 | Command for Switching scans |

Note:
A dump signal is the reset and initialization signal applied to various parts of the device.

For simple analogue use the following sequence of commands is employed: 4, 2, 3, 5, 7, 1, 6. The commands are designed to last either for 143 μ seconds or for 73 milliseconds depending on the wiring of the digital stepping logic. Representing a short cycle with an "S" suffix and a long cycle with an "L" suffix the whole sequence becomes 4S, 2S, 3L, 5S, 7S, 1S, 6L.

In FIG. 11, the voltage waveform appearing at the output terminal 150 is indicated, by way of example, for one complete scan. Similarly, the voltage obtained on the other side of the illustrated capacitor, i.e., at terminal 152, is also illustrated, by way of example, in FIG. 11.

Part of the area normalization circuitry 90 (FIG. 8) is illustrated in FIG. 12 and the capacitor $C_3$ is identified by the numeral 154, its value being 0.01 μF. The associated constant resistance is 975 ohms and is represented by the resistor 156 in FIg. 12. Thus, $R = R_1 = R_2 = R_3 = 975$ ohms in the above consideration. It will be appreciated that the triangular symbol in the drawings represents an integrated amplifier circuit and, in FIG. 12, the output from the area normalization is obtained at terminal 158 which, as will be clear from a consideration of FIG. 8, is connected to the normalization input signal points of the stages 82 and 86.

size of the area 10. Upon completion of the scanning operation, the capacitor $C_3$ and both of the capacitors $C_1$ and $C_2$ integrate the scanning voltage, and are permitted to decay (i.e. discharge) through the precisely controlled resistances $R = R_1 = R_2 = R_3$ (156 in FIG. 12) until the control capacitor reaches a pre-set voltage. In one constructed arrangement this pre-set voltage was 500 millivolts.

In FIG. 13, there is diagrammatically illustrated a bias storage circuit 160 for producing the required bias to offset the spiral scan, as explained below, a spiral mixing circuit 162 (for the x deflection plate of the vidicon camera 50 — FIG. 8), the circuit for the y deflection plate being similar, and an inverter and switching stage 164.

The actual construction of the circuit in FIG. 13 will be clear from a consideration of that Figure. A voltage derived from the deflection plate is applied to connection 166 to which is connected one end of a plurality of resistors which may be switched into circuit by the illustrated switches. A signal input voltage from the video signal unit 54 (FIG. 8) is applied along the connection 56 and a dump signal is applied along connection 168.

The purpose of the deflection storage circuit 160 is to charge up the above-mentioned capacitor $C_1$ and to discharge it through the fixed resistor R=975 ohms. The capacitor $C_1$ is identified in FIG. 13 as well as the capacitor R which may also be representative of a series portion of the succeeding transistor. As will be apparent, it is necessary to ensure that the spiral scanning waveform provided to the Vidicon camera 50 (FIG. 1) is offset so as to be "centered" on the predetermined location of the centroid C (FIG. 1) of the respective area 10. This offset is produced by the illustrated circuit and, after the co-ordinates of the centroid C are determined in the rectangular co-ordinate system, then corresponding voltages are stored by the illustrated selectable resistors and their associated capacitor. These scanning voltages are stored whilst a respective video signal is present on connection 56 corresponding to the portion of the area 10 which is being scanned. By providing a plurality of selectable resistors in the circuit, it is possible to adjust the circuit in dependence on the size of the object, i.e. the area 10, which is being scanned so as to operate in the most effective voltage range no matter what the size of the area 10 being scanned.

The output from the bias storage circuit 160 is mixed with the input from the spiral generator appearing on connection 138 (FIGS. 11 and 13), in respect of the x deflection, in the mixer stage 162. The output thereof is then applied to the inverter and switching stage 164 which also receives an input from the rectangular raster generator on connection 130 (FIGS. 10 and 13).

Thus, the input voltage on connection 166 has been corrected for size effects, has been amplified and mixed with a decreasing set of sinusoidal voltages (connection 138), the output has again been amplified and is now presented to the switch portion of circuit 164 along with the rectangular waveform raster voltage. The switch then determines whether the spiral waveform or the rectangular waveform is required and a corresponding pair of signals is fed out on the output connection 170, an inverse thereof also being obtained and provided on the second output to the deflection plates on connection 172. Similar outputs are obtained from similar circuits for the y deflection plates.

It will be appreciated that the circuit illustrated in FIG. 13 corresponds, at least in part, to the stages 82 and 86 in FIG. 8. Similarly, the circuit of FIG. 12 corresponds to the stage 90 in FIG. 8 whilst FIG. 11 is representative of the ramp modulator stage 66. FIGS. 9 and 10 respectively are representative of the stages 70 and 74 of FIG. 8.

A typical arrangement for the stage 104 is diagrammatically illustrated in FIG. 14 which may be referred to as the $\theta$ pick-off storage and timing offset to the x and y pick-off stages.

In FIG. 14 the $\theta$ storage initiator circuits are identified by 174 having an input on connection 114 and video signal input of digital form along connection 56 (FIGS. 8 and 14). The next circuit is the $\theta$ storage circuit 176 in FIG. 14, which is provided with a dump signal voltage on connection 110 (FIGS. 8 and 14), whilst this is followed by the timing offset delay circuit 178 which provides the required output from the apparatus on connection 120 which, as will be seen in FIG. 8, is connected to the input of the analogue switch stage 122. The timing offset delay circuit 178 also provides an output on connection 102 (FIGS. 8 and 14) to the x and y pick-off stages identified as 98 and 100 in FIG. 8.

The x and y pick-off storage stages are diagrammatically illustrated in FIG. 15 and it will be seen that they comprise an x and y storage circuit 180 and an x and y storage initiator circuit 182. Connection 102 from the circuit of FIG. 14 divides to provide an x input connection 186 from the deflection plates.

The circuit 180 provides a voltage output to the x and y storage initiator along connection 188, the storage initiator circuit being also provided with an input from the y ramp generator 70 (FIG. 8) along connection 76 (FIGS. 8 and 15). A further voltage input is obtained along connection 190 from the timing offset circuit.

In FIG. 15, the x output connection 116 and the y output connection 118 to the analogue switch 122 (FIG. 8) are clearly indicated.

It will be appreciated that in FIG. 14 the input voltage follower stage tracks the ramp (sawtooth voltage) until the signal is recorded. Then the illustrated sample and hold circuit takes over and succeeding levels equal to that stored by the $\theta$ storage network 176 initiates a delay circuit that specifies the $\theta$ component of the pick-off point 30 in FIG. 5. As will be appreciated, the x and y pick-off storage circuitry of FIG. 14 selects the point in time at which the x and y scanning voltages of the spiral scan correspond to the correct value of distance and angle $(r, \theta)$ relative to the centroid C (FIG. 5) and these corresponding voltages are stored. These two voltages then determine the pick-off point 30 of (FIG. 5). In the consideration of the circuits illustrated, it will be clear that the point is determined by AND circuits which operate so as to determine that both the decreasing sinusoid is below a pre-set peak-to-peak voltage and that a pulse is present from the illustrated $\theta$ pick-off circuits.

In the above description, there has been described one arrangement whereby apparatus according to the present invention can be constructed. Typical circuits for use in such apparatus have been briefly described and illustrated and it is believed that the operation thereof will be apparent. However, it will be appreciated that other circuits may be conveniently designed so as to operate in a similar manner according to the present invention.

As mentioned above, the apparatus according to one embodiment of the present invention was designed for the use with the above-mentioned Unimate machine tool. In FIG. 16, there is diagrammatically illustrated a block diagram of apparatus according to the invention particularly for use with such a Unimate machine tool. FIG. 17 is a simplified diagram to illustrate how $\theta$ is determined for the machine tool.

The television system will provide the location and orientation information of an individual part lying on a table. The first function will be carried out by the camera as it is moved into position 18 inches above the work table. It will then produce two analogue signals representative of the displacement required to put the camera lens directly over the object, although this step is not essential to the present invention. In addition, any displacement of the object from the field center position greater than .1 inches will cause the closing of one high speed relay along each axis. Thus, there will be digital and analogue outputs to the driving mechanism for the arm.

The second function of the camera will then be carried out. This operation will determine the angular orientation of the part on the work table and move the claw hand to the optimum angle for picking up the part.

A final motion will move the camera so that the center of its field will be over the best pick-up point on the part. The arm will then execute two motions: the first to move the claw into the position in space previously occupied by the camera lens, and the second, to have it move down to pick up the piece.

The camera may be built around a Vidicon tube used in large volume by the military and ruggredized to meet military standards. There will only be three primary controls needed upon it. The first will be a toggle switch to select the case of dark backgrounds with bright objects and vice versa. The second and third controls will be adjustment potentiometers to specify the displacement and distance between the visual centroid and the best pick-up point. A second set of controls, which set the camera's focus, etc. would not normally be touched between preventative maintenance periods.

The physical configuration of the proposed system as installed may be such that the camera head is mounted to the left side of the Unimate wrist assembly. An additional unit containing transformer power supplies may be mounted at a convenient location in or on the Unimate base with cables connecting the two.

The system will produce, when activated, three arm-control signals in succession. A description of these three signals and the way in which they are produced will now be given in conjunction with FIG. 16, the block diagram of the overall system.

When the system is initially activated, the scan switch will be set so that a normal horizontal sweep T.V. raster will control the motion of the electron beam of the Vidicon. The sweep circuitry will be electrostatic with the chosen Vidicon tube type, RCA 4514, to permit very close control of the actual deflection and to permit precise read offs of this deflection by other circuits. While some magnetic deflection Vidicon tubes exist which have low inductance, 174 $\mu$ H for example, on both axes, there would always be a difference between the instantaneous voltage and the deflecting current. Since this difference would not generally be simple it must be concluded that magnetic tubes should be avoided.

The T.V. raster generator will be synchronized with the 60 cycle per second signal from the power line. The generated voltage will produce peak swings of 30 volts. When driven with this voltage, the Vidicon will produce an output dependent on the view scanned. If the switch is set for "BRIGHT" background, then a sudden darkening of the scan output will be taken by the object signal detection circuit to indicate a signal from the object. This signal will cause the vertical and horizontal deflection storage units to be activated and integrate the deflection voltages. At any time a signal is not detected, the storage units will be temporarily deactivated.

When a scan has been completed, the stored voltages are normalized as described above.

The dimensions obtained then give directly the vertical and horizontal centroid. These are then transmitted to the Unimate logic control for motion of the arm.

While the arm is moving, and until the camera and object are coincident, the camera will continue to produce signals indicating the remaining displacement required of the camera. In doing so it will be necessary to blank out that portion of the Vidicon receiving an image from an area outside the original work area (unless a very large area is used). Otherwise, as it moves to center a piece near the edge a workman walking by the bench might be partly imaged on the camera. When the piece is finally centered under the eye, four relays controlled by the analogue outut will all open-circuit at once.

The scan switch will then shift to the generators for a spiral scan. These generators will produce a sine-wave of gradually decreasing amplitude and the inverted and phase-shifted complements of the sine-wave. The Vidicon beam will be deflected by these voltages into a spiral of decreasing radius. At first it will be over portions of the work area and adjacent area (which will be masked off as in the horizontal scan). Finally it will begin to cross the object and pick up a signal. At this time the vertical and horizontal store circuits, dumped from the last scan and sensitized by drastic reduction in RC time constants, are turned on to record these new scan voltages. After a total area of about 0.25 square inches of the object has been recorded in this way, the object signal detection circuit will be deactivated and processing will begin on the two storage registers, which now hold the co-ordinates of the part farthest from its center.

An angle $\theta$ from 0 to $2\pi$ will also be stored by charging a capacitor during the period shown in FIG. 17.

From this $\theta$ information the claw hand can be oriented.

Since there will be no direct feedback to the T.V. system from the claw hand, it will be necessary for the Unimate to produce a "claw oriented" pulse. Once that is completed, the T.V. system will determine the third control signal required, location of the claw hand relative to the visual centroid and the radial extreme.

Two potentiometers, with easily adjustable wipers, will be electrically connected in such a way that an adjustment of one wiper will move the eye on a line parallel to the line between the centroid and the radial extreme, and adjustment of the other will move the eye on a line perpendicular to that axis. Thus, the two potentiometer positions will define the final position desired. In operation, each side of the potentiometer will be supplied with a sine-wave of large amplitude and opposite polarity. At the point of the cycle when the voltage from the radial extreme matches that of one end of the potentiometer with wiper position $a$, the wiper voltage will be stored as ($a\ r \cos \theta$). When the end point of the potentiometer matches that of the stored Y scan voltage, the wiper position is again stored as ($a\ r \sin \theta$).

The second potentiometer, with wiper position b, stores by the same process wiper voltages:

$V = b\ r \cos \theta$ and $V = b\ r \sin \theta$

These voltages are then added to give:

$x = a\ r \cos \theta + b\ r \cos \theta = (r \cos \theta)(a + b)$ and $Y = a\ r \sin \theta - b\ r \sin \theta = (r \sin \theta)(a + b)$ These are the co-ordinates of the desired position. These voltages are then fed to the Unimate as the final adjustment voltages after amplification and impedance reduction.

If we assume that the work table is at such a height that any part can be reached with the arm in a horizontal position, then only the radial and angular dimensions (in the horizontal plane) are necessary outputs.

The T.V. camera will produce initial outputs on a rectangular co-ordinate system, and it is necessary to convert this information into a polar co-ordinate system before it can be used by the Unimate. A linear approximation procedure in which terms of the first order only are preserved seems to give satisfactory accuracy as will now be described.

At the lower corners of an 18 inch work table, located near the retracted position of the arm, the differences between a polar and rectangular co-ordinate system amount to 0.81 inch R × 0.68 inch $\theta$. Using the expressions:

$$R = R_c \text{ (center)} + Y - a \, |X|$$

$$\theta = \theta_c \text{ (center)} - X - bYX$$

the average error is reduced, for proper choice of a and b, to 0.541 inch R × 0.002 inch $\theta$ for an 18 inch work table located at the farther extension of the arm and 0.0752 R inch × 0.005 inch $\theta$ for work positions near the retracted arm position. These multiplications would be carried out by potentiometers preset to the figure appropriate for the particular work station. Those figures compare well with the maximum accuracy of the T.V. camera (0.04 inch) and the maximum accuracy of the Unimate (0.05 inch).

From a mathematical point of view, the determination of (a) for an 18 inch square table may be as follows: It will be clear that:

$$0 = \alpha \int_0^{18} \int_{-9}^{9} \left( \frac{x^2}{2R+2} - a\,|x| \right)^2 dx\, dy$$

$$= \frac{\alpha \int_0^{18} \left[ \int_{-9}^{0} \left( \frac{-a|x|^3}{R+y} + a^2 x^2 \right) dx \right] dy}{a}$$

$$= \frac{\alpha \int_0^{18} \left[ \frac{a|x|^4}{4(R+y)} - \frac{a^2 x^3}{3} \right]_{-9}^{0} dy}{a}$$

$$= \frac{\alpha \left\{ [-486 a^2]_0^{18} + \tfrac{1}{2} \int_0^{18} \left( \frac{6561 a}{R+y} \right) dy \right\}}{a}$$

$$= \frac{\alpha \left( -8750 a^2 + \frac{6561 a}{2} [\ln(R+y)]_0^{18} \right)}{a}$$

$$= -17{,}500 a + \frac{6561 a}{2} (\ln(R+18) - \ln R)$$

Solving this equation for (a) for R = 50 inches and R = 72 inches, it will be clear that:

$$R = 50, a = .0584$$

and $$R = 72, a = .0418$$

For the determination of the mean square error for an 18 inch table, given R and $a$, we proceed as follows:

$$f(a,R) = \int_0^{18} \int_{-9}^{9} \left( \frac{x^2}{2(R+Y)} - a\,|x| \right)^2 dx\, dy$$

$$= \int_0^{18} \left[ \int_0^{9} \left( \frac{x^2}{2(R+y)} - ax \right)^2 dx + \int_{-9}^{0} \left( \frac{x^2}{2(R+y)} + ax \right)^2 dx \right] dy$$

$$= \int_0^{18} \left[ \int_0^{9} \left( \frac{x^4}{4(R+y)^2} - \frac{ax^3}{2(R+y)} + a^2 x^2 \right) dx + \int_{-9}^{0} \left( \frac{x^4}{r(R+y)^2} + \frac{ax^3}{2(R+y)} + a^2 x^2 \right) dx \right] dy$$

$$= \int_0^{18} \left[ \left( \frac{x^5}{20(R+y)^2} - \frac{ax^4}{8(R+y)} + \frac{a^2 x^3}{3} \right)_0^{9} + \left( \frac{x^5}{20(R+y)^2} + \frac{ax^4}{8(R+y)} + \frac{a^2 x^3}{3} \right)_{-9}^{0} \right] dy$$

$$= \int_0^{18} \left( \frac{6561}{10(R+y)^2} + 243.2\, a^2 \right) dy$$

$$f(a,R) = \int_0^{18} \frac{6561\, dy}{10(R+y)^2} + 4374\, a^2$$

$$= \left[ \frac{-6561}{10(R+y)} \right]_0^{18} + 4374\, a^2$$

$$= 4374\, a^2 + \frac{656.1}{R} - \frac{656.1}{(R+18)}$$

-continued $$\sqrt{\frac{f(.0584,50)}{18^2}} = .0752'', \sqrt{\frac{f(.0418,72)}{18^2}} = .0541''$$

The worst case error would be 0.27 inch R × 0.05 inch θ for a retracted arm position and 0.17 inch R × 0.02 inch θ for an extended arm position.

The implementation of these approximations, and the process of obtaining from them digital radius and angle information will require an analogue-digital converter, storage registers, potentiometer multipliers, a parallel adder, and suitable gating and sequencing.

The timing relationships can be estimated from the following table:

| No. of Operations | Type of Operation | Time for Each Operation | Total |
|---|---|---|---|
| 5 | Analogue-Digital conversion | 10 m sec. | 50 m sec. |
| 4 | Potentiometer multiplication | 10 m sec. | 40 m sec. |
| 2 | T.V. scans with storage | 20 m sec. | 40 m sec. |
| 6 | Additions | 300 m sec. | — |
| 1 | Set up time and sequencing | 20 m sec. | 20 m sec. |
|   |   |   | 150 m sec. |

This response time of 0.15 sec. should be unnoticeable in practice.

A primary limitation of the system as proposed would be that it could not operate with more than one part on the work table at any one time, and it would be, in general, necessary for that part to be lying on one usual side. This limitation could be greatly reduced by further obvious development work toward multiple spiral scan patterns, together with electronic masking techniques. It is likely that, where components are separated by a distance greater than their largest diameter, an improved version of the device constructed as indicated would be capable of discriminating and locating them from a tray.

Part identification should be feasible with this system and further research could be directed toward building devices that discriminate at least on the basis of other parameters reasonable possibilities.

Part orientation for three dimensional objects could be obtained from such information as three axis size and projection. A system built around a capability of this sort would have the flexibility to turn over a part that happened to be upside down.

Through a combination of the above procedures, a system could be developed that could discriminate parts in a bin, successfully removing them one at a time.

It will be appreciated that the apparatus for determining the position and orientation of an object is not restricted to use of the centroid determining apparatus described and/or claimed herein but may utilize any suitable centroid-determining apparatus.

It will be appreciated that the invention is not restricted to the particular circuits illustrated but other circuits will readily come to mind for use in apparatus according to the present invention, for example, timing circuits, for handling timing signals, may be used in place of, or in addition to, the capacitor/resistor charge and discharge circuits. Such apparatus is not, of course, restricted to application to machine tools.

Modifications may be made within the purview of the appended claims.

What I claim is:

1. Apparatus for determining the co-ordinates of the centroid of an area including:
   a. first means for electronically scanning said area in a substantially rectangular raster pattern with each line scan of said raster being at a predetermined respective frame voltage;
   b. second means for generating a line scan voltage which varies uniformly from a first fixed value at one end of each line scan to a second fixed value at the other end of each line scan;
   c. third means summing a voltage value proportional to each predetermined respective frame voltage for the duration of time the corresponding line is incident on the area to obtain a first final voltage representative of the average value of the frame voltage in the said area times the area itself;
   d. fourth means for summing a voltage value for the respective portions of the line scan voltage for the duration of time the corresponding line scan is incident on said area to obtain a second final voltage representative of the line scan voltage in the said area times the area itself;
   e. fifth means for summing a voltage value proportional to the time durations of the incidence of the respective line scans on the area;
   f. sixth means for determining the particular time taken for said summed voltage quantities in accordance with (e) to decrease at a predetermined rate to a predetermined value; and,
   g. seventh means for causing said first and second final voltages to decrease at the same said predetermined rate for said particular time whereby the resultant voltage corresponding to said first final voltage is representative of one rectangular co-ordinate of said centroid in the plane containing said area and the resultant voltage corresponding to said second final voltage is representative of the second rectangular co-ordinate in said plane.

2. Apparatus according to claim 1 wherein said means for scanning said area is a television camera having an electrostatic camera tube forming a part of the scanning system.

3. Apparatus according to claim 1 wherein said third, fourth, fifth, sixth and seventh means each includes means for converting the various voltages to digital equivalents, said digital equivalents being then summated to produce digital equivalents to the first and second summed voltage and thereafter processed in a digital manner.

4. Apparatus according to claim 1 wherein:
   a. said third means is a first storage means for accumulating each predetermined respective frame voltage for the duration of time the corresponding line scan is incident on said area;
   b. said fourth means provides a further storage for accumulating the voltage produced for the line scan to said area;

c. said fifth means is a third storage means for accumulating a constant voltage through a fixed resistor for the duration of time each line scan is incident on said area so as to assume a final voltage representative of the area scanned;
d. said sixth and seventh means providing an accumulative voltage in each storage means to leak away through resistors of equal resistive value until the voltage on said storage means of (c) reaches a specific said voltage value to terminate the process;
e. first discharge means for discharging said first accumulating means through said first resistive means;
f. second discharge means for discharging said second accumulating means through said third resistive means;
g. third discharge means for discharging said third accumulating means through said third resistive means; and
h. control means for controlling the discharge tine of said first and second storage means so as to be equal to the discharge time required by said first storage means to discharge through said third resistive means from said final voltage to a predetermined voltage whereby the resultant voltage on said first storage means is representative of one rectangular co-ordinate of said centroid in the plane containing said area and the resultant voltage on said second storage means is representative of the second rectangular co-ordinate of said centroid in said plane.

5. Apparatus according to claim 4 wherein each of said first, second and third storage means is a capacitive storage means.

6. Apparatus according to claim 5 wherein said first, second and third storage means comprise first, second and third capacitors respectively and said first, second and third resistive means comprise first, second and third resistors each of a resistance value which is inversely proportional to the value of the respective capacitor.

7. Apparatus in accordance with claim 6 in which all of said capacitors have equal capacitance value and all of said resistors have equal resistance value.

8. Apparatus for determining the position and orientation of an object for providing pick-up signals to a work member, said object always presenting the same surface area in one direction including:
a. a scanning device adapted to be directed at said object from said one direction;
b. first means for causing said scanning device to scan said object in a substantially rectangular raster pattern to locate the centroid of said area and to provide first signals indicative of the location of said centroid;
c. second means for causing said scanning device to scan said object in a substantially spiral pattern towards the located centroid;
d. third means responsive to the first incidence of said spiral scan pattern with the object to provide a second signal corresponding thereto;
e. fourth means responsive to said second signal and said first signals to calculate the position of a predetermined pick-up part of said object; and
f. fifth means in combination with said third and fourth means for providing further resultant signals indicative of the position and relative orientation of said pick-up part to said work member.

9. Apparatus according to claim 8 wherein said scanning device is a television camera having an electrostatic camera tube forming a part of the scanning system.

10. Apparatus according to claim 8 wherein said first means includes:
a. sixth means for causing said scanning device to electronically scan said area in a substantially rectangular raster pattern, each line scan of said raster being at a predetermined respective voltage;
b. seventh means for generating a line scan voltage having a first fixed value at one end of the line scan and a second fixed value at the other end of the line scan, said first and second fixed voltages being the same and the rate of variation therebetween being the same for each line scan;
c. eighth means for obtaining a first summated final voltage by summing a quantity proportional to each predetermined respective voltage for the duration of time the corresponding line scan is incident on the area;
d. ninth means for obtaining a second summated final voltage by summing the respective portions of the line scan voltage for the duration of time the corresponding line scan is incident on said area;
e. tenth means for producing a summated voltage proportional to the time durations of the incidence of the respective line scans on the area;
f. eleventh means for determining the particular time taken for said summated quantity to decrease at a constant rate to a predetermined value; and
g. twelfth means for causing said first summated final voltage and said second summated final voltage to decrease at said constant rate for said particular time whereby the resultant voltage corresponding to said first summated voltage is representative of one rectangular co-ordinate of said centroid in the plane containing said area and the resultant voltage corresponding to said second summated voltage is representative of the second rectangular co-ordinate in said plane.

11. Apparatus according to claim 10 wherein:
a. said eighth means is a first storage means for storing each predetermined respective voltage for the duration of time the corresponding line scan is incident on said area;
b. said ninth means is second storage means for storing the respective portion of the line scan voltage for the duration of time the corresponding line scan is incident on said area;
c. said tenth means is third storage means for storing a constant voltage for the duration of time each line scan is incident on said area so as to assume a final voltage representative of the area scanned;
d. said eleventh and twelfth means including first, second and third resistive means, each of the same resistance value;
e. first discharge means for discharging said first storage means through said first resistive means;
f. second discharge means for discharging said second storage means through said second resistive means;
g. third discharge means for discharging said third storage means through said third resistive means; and,
h. control means for controlling the discharge time of said first and second storage means so as to be equal to the discharge time required by said first storage means to discharge through said third resistive means from said final voltage to a predetermined voltage whereby the resultant voltage on said first storage means is representative of one rectangular co-ordinate of said centroid in the plane containing said area and the resultant voltage on said second storage means is representative of the second rectangular co-ordinate of said centroid in said plane.

12. Apparatus according to claim 11 wherein each of said first, second and third storage means is a capacitive storage means.

13. Apparatus according to claim 10 wherein said eighth, ninth, tenth, eleventh and twelfth means each comprise digital means.

14. Apparatus according to claim 13 including preset potentiometers to control the movement of said work member over said pick-up part whereby said object can be picked up by said work member.

15. Apparatus according to claim 10 wherein:
  a. said third means initiates a predetermined voltage waveform at the commencement of said spiral scan pattern from a predetermined point and said second signal is a pulse having the magnitude of said voltage waveform at said first incidence;
  b. gating means for gating said pulse with a relatively wide pulse to provide a gate output which is representative, in time, of the angular position of said first incidence;
  c. delay means is provided to delay said gate output pulse by a time corresponding to the angle O between the point on said object corresponding to said first incidence and said pick-up part of said object; and,
  d. the delayed gate output pulse from said delay means being thus indicative of the position of said pick-up part whereby said further resultant signals can be provided.

16. Apparatus according to claim 15 wherein said predetermined voltage waveform is the vertical scan voltage waveform.

17. The method of obtaining at least one rectangular coordinate of the centroid of a surface which comprises: electronically scanning the surface with scan lines parallel to one of the X and Y axes and in a substantially rectangular raster pattern longer in both X and Y directions than said surface, summing voltage signals representative of at least one of the X and Y frame voltages of each line during the period of incidence of the respective line on the surface during the scanning of a complete raster pattern, and dividing the thus obtained sum by a value representative of area of the surface thereby to obtain the value of the respective one of said X and Y frame voltages which corresponds to said centroid.

18. The method in accordance with claim 17 which includes charging from a constant voltage during the period of incidence of each line on said surface during the scanning of a complete raster pattern thereby to obtain a sum having a value of which is representative of the area of said surface.

19. The method in accordance with claim 18 which includes supplying constant voltage signals to a capacitor whereby the built up voltage on the capacitor at the end of the scanning of a complete raster pattern has a value representative of the area of said surface.

20. The method in accordance with claim 17 which includes supplying said voltage signals to a capacitor whereby the built up voltage on the capacitor at the end of the scanning of a complete raster pattern represents said sum.

21. The method in accordance with claim 20 which includes reducing said built up voltage at a predetermined rate for a predetermined length of time to effect said dividing.

22. The method in accordance with claim 20 which includes supplying said constant voltage signals to a capacitor whereby the built up voltage on the capacitor at the end of the scanning of a complete raster pattern has a value representative of the area of said surface, determining the period of time required to reduce the built up voltage on the last mentioned said capacitor at the end of the scanning of a complete raster pattern down to a predetermined value at a predetermined rate, and reducing the built up voltage on the first mentioned capacitor at the same rate and for the same period of time to effect said dividing.

23. The method in accordance with claim 17 which includes individually summing voltage signals representative of each of said X and Y frame voltages of each line during the period of incidence of the respective line on the surface during the scanning of a complete raster pattern, and dividing each thus obtained sums by a value representative of the area of said surface thereby to obtain the values of the X and Y frame voltages which correspond to said centroid.

24. The method in accordance with claim 23 which includes supplying the respective voltage signals to respective capacitors whereby the built up voltages on said capacitors at the end of the scanning of a complete raster pattern represent said sums.

25. The method in accordance with claim 24 which includes reducing said built up voltages at the same predetermined rate for the same predetermined length of time to effect said dividing.

26. The method in accordance with claim 24 which includes supplying said constant voltage signals to a capacitor whereby the built up voltage on the capacitor at the end of the scanning of a complete raster pattern has a value representative of the area of said surface, determining the period of time required to reduce the built up voltage on the last mentioned said capacitor at the end of the scanning of a complete raster pattern down to a predetermined value at a predetermined rate, and reducing the volages on the first mentioned capacitors at the same rate and for the same period of time to effect said dividing 27. The method in accordance with claim 23 which includes charging from a constant voltage during the period of incidence of each line on said surface during the scanning of a complete raster pattern thereby to obtain a sum having a value of which is representative of the area of said surface.

28. The method in accordance with claim 27 which includes supplying constant voltage signals to a capacitor whereby the built up voltage on the capacitor at the end of the scanning of a complete raster pattern has a value representative of the area of said surface.

29. The method of locating the centroid of a surface which comprises: electronically scanning said surface with scan lines in a substantially rectangular raster pattern larger in all directions than said surface, charging first and second capacitors by supplying thereto voltage signals representative respectively of the vertical and horizontal frame voltages of each line during the period of incidence of the line on the surface, discharging each of said capacitors through a respective resistor, and interrupting the discharging of said first and second capacitors at the end of a time period equal to the time period required for the voltage on a third capacitor to reach a predetermined lower level.

30. The method in accordance with claim 29 which includes supporting said surface inside the limits of said raster pattern with a contrasting background surrounding said surface and extending therefrom at least to the limits of said raster pattern.

31. The method in accordance with claim 29 which includes selecting each said resistor such that it has a resistive value inversely proportional to the value of the respective capacitor.

32. The method in accordance with claim 31 which includes selecting all of said capacitors so as to be of equal capacitive value whereby all of said resistors are of equal resistive value.

33. The method of determining the coordinates of the centroid of a predetermined surface which comprises: supporting the surface with a contrasting background in surrounding relation thereto, electronically scanning the surface in a substantially rectangular raster pattern having limits disposed outside the limits of the said surface, unidirectionally adjusting the Y axis voltage of successive scan lines, unidirectionally adjusting the X axis voltage of each line between fixed first amounts at the beginning of each line and a fixed second amount at the end of each line, independently establishing first and second voltages for the periods of time the lines are incident on the surface, establishing a third voltage proportional to the sum of the time periods of incidence of the lines on said surface, determining the time period required to diminish said third voltage to a predetermined lower value at a rate bearing a predetermined relation to the third voltage, and diminishing each of said first and second voltages at rates bearing the same said relation to the respective voltages for a duration equal to said predetermined time period, said first, second and third reduced voltages being representative, respectively, of the rectangular coordinates of the centroid of the surface and the area of said surface.

* * * * *